(12) United States Patent
Hollingsworth et al.

(10) Patent No.: US 8,319,439 B2
(45) Date of Patent: Nov. 27, 2012

(54) ELECTRODELESS PLASMA LAMP AND DRIVE CIRCUIT

(75) Inventors: Gregg Hollingsworth, Tempe, AZ (US); Marc DeVincentis, Palo Alto, CA (US); Anthony D. McGettigan, Santa Rosa, CA (US); Sandeep Mudunuri, Sunnyvale, CA (US); Naresh Murthy, Monte Sereno, CA (US); Dan O'Hare, Livermore, CA (US)

(73) Assignee: Luxim Corporation, Sunnyvale, CA (US)

(*) Notice: Subject to any disclaimer, the term of this patent is extended or adjusted under 35 U.S.C. 154(b) by 463 days.

(21) Appl. No.: 12/562,630

(22) Filed: Sep. 18, 2009

(65) Prior Publication Data

US 2010/0156301 A1 Jun. 24, 2010

Related U.S. Application Data

(60) Provisional application No. 61/098,190, filed on Sep. 18, 2008.

(51) Int. Cl.
*H05B 37/02* (2006.01)
*H05B 41/24* (2006.01)
(52) U.S. Cl. ............... 315/149; 315/111.21; 313/231.61
(58) Field of Classification Search .............. 315/149, 315/112, 307, 34, 39, 111.21, 291, 248, 194; 313/231.61, 635
See application file for complete search history.

(56) References Cited

U.S. PATENT DOCUMENTS

| 3,787,705 A | 1/1974 | Bolin et al. |
|---|---|---|
| 3,826,950 A | 7/1974 | Hruda et al. |
| 4,001,631 A | 1/1977 | McNeill et al. |
| 4,206,387 A | 6/1980 | Kramer et al. |
| 4,485,332 A | 11/1984 | Ury et al. |
| 4,498,029 A | 2/1985 | Yoshizawa et al. |
| 4,633,140 A | 12/1986 | Lynch et al. |
| 4,749,915 A | 6/1988 | Lynch et al. |
| 4,795,658 A | 1/1989 | Kano et al. |
| 4,887,192 A | 12/1989 | Simpson et al. |

(Continued)

FOREIGN PATENT DOCUMENTS

JP 8148127 6/1996

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Daniel D Chang

(74) *Attorney, Agent, or Firm* — Schwegman Lundberg & Woessner, P.A.

(57) ABSTRACT

An electrodeless plasma lamp and a method of controlling operation of a plasma lamp are provided. The plasma lamp may a power source to provide radio frequency (RF) power and a lamp body to receive the RF power from a feed. The lamp body may comprise a dielectric material having a dielectric constant greater than 2 and bulb is provided that contains a fill that forms a plasma that emits light when at least a portion of the RF power is coupled to the fill. A light guide directs light from the bulb to a photosensor that is shielded from light output from a front side of the lamp body. The lamp includes a drive circuit to control operation of the lamp based on a level of light detected by the photosensor.

20 Claims, 14 Drawing Sheets

U.S. PATENT DOCUMENTS

| | | | |
|---|---|---|---|
| 4,950,059 | A | 8/1990 | Roberts |
| 4,975,625 | A | 12/1990 | Lynch et al. |
| 4,978,891 | A | 12/1990 | Ury |
| 5,039,903 | A | 8/1991 | Farrall |
| 5,070,277 | A | 12/1991 | Lapatovich |
| 5,072,157 | A | 12/1991 | Greb et al. |
| 5,086,258 | A | 2/1992 | Mucklejohn et al. |
| 5,361,274 | A | 11/1994 | Simpson et al. |
| 5,438,242 | A | 8/1995 | Simpson |
| 5,448,135 | A | 9/1995 | Simpson |
| 5,498,937 | A | 3/1996 | Korber et al. |
| 5,525,865 | A | 6/1996 | Simpson |
| 5,594,303 | A | 1/1997 | Simpson et al. |
| 5,786,667 | A | 7/1998 | Simpson et al. |
| 5,910,710 | A | 6/1999 | Simpson |
| 5,910,754 | A | 6/1999 | Simpson et al. |
| 5,923,116 | A | 7/1999 | Mercer et al. |
| 6,020,800 | A | 2/2000 | Arakawa et al. |
| 6,031,333 | A | 2/2000 | Simpson |
| 6,049,170 | A | 4/2000 | Hochi et al. |
| 6,137,237 | A | 10/2000 | MacLennan et al. |
| 6,246,160 | B1 | 6/2001 | MacLennan et al. |
| 6,252,346 | B1 | 6/2001 | Turner et al. |
| 6,265,813 | B1 | 7/2001 | Knox et al. |
| 6,313,587 | B1 | 11/2001 | MacLennan et al. |
| 6,424,099 | B1 | 7/2002 | Kirkpatrick et al. |
| 6,566,817 | B2 | 5/2003 | Lapatovich |
| 6,617,806 | B2 | 9/2003 | Kirkpatrick et al. |
| 6,666,739 | B2 | 12/2003 | Pothoven et al. |
| 6,737,809 | B2 | 5/2004 | Espiau et al. |
| 6,856,092 | B2 | 2/2005 | Pothoven et al. |
| 6,922,021 | B2 | 7/2005 | Espiau et al. |
| 7,034,464 | B1 | 4/2006 | Izadian et al. |
| 7,291,985 | B2 | 11/2007 | Espiau et al. |
| 7,348,732 | B2 | 3/2008 | Espiau et al. |
| 7,358,678 | B2 | 4/2008 | Espiau et al. |
| 7,362,054 | B2 | 4/2008 | Espiau et al. |
| 7,362,055 | B2 | 4/2008 | Espiau et al. |
| 7,362,056 | B2 | 4/2008 | Espiau et al. |
| 7,372,209 | B2 | 5/2008 | Espiau et al. |
| 7,391,158 | B2 | 6/2008 | Espiau et al. |
| 7,429,818 | B2 | 9/2008 | Chang et al. |
| 8,063,565 | B2 * | 11/2011 | Hafidi et al. ............. 313/635 |
| 8,084,955 | B2 * | 12/2011 | Ralston et al. ............. 315/248 |
| 2001/0035720 | A1 | 11/2001 | Guthrie et al. |
| 2005/0212456 | A1 | 9/2005 | Espiau et al. |
| 2005/0286263 | A1 | 12/2005 | Champion et al. |
| 2006/0250090 | A9 | 11/2006 | Guthrie et al. |
| 2007/0109069 | A1 | 5/2007 | Espiau et al. |
| 2007/0222352 | A1 | 9/2007 | DeVincentis et al. |
| 2008/0054813 | A1 | 3/2008 | Espiau et al. |
| 2008/0211971 | A1 | 9/2008 | Pradhan |
| 2009/0026911 | A1 * | 1/2009 | Hafidi et al. ............. 313/231.61 |
| 2009/0167201 | A1 * | 7/2009 | Duelli et al. ............. 315/248 |

FOREIGN PATENT DOCUMENTS

| | | |
|---|---|---|
| JP | 2001266803 A | 9/2001 |
| JP | 2003249197 A | 9/2003 |
| KR | 102005001858 A | 2/2005 |
| WO | WO-2006070190 A1 | 7/2006 |
| WO | WO-2006129102 A2 | 12/2006 |
| WO | WO-2007138276 A2 | 12/2007 |
| WO | WO-2010033780 A1 | 3/2010 |

OTHER PUBLICATIONS

"Chapter 6.3—Rectangular Waveguide Cavities", in: Microwave Engineering, Pozar, D. M., Editor (John Wiley & Sons, Inc.), (Jul. 1997), pp. 313-318.

"International Application Serial No. PCT/US2009/057444 , Search Report mailed Jan. 13, 2010", 6 pgs.

"International Application Serial No. PCT/US2009/057444, Written Opinion mailed Jan. 13, 2010", 6 pgs.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp is Built into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, and Neate, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That is Integrated into a Waveguide", U.S. Appl. No. 60/262,536, filed Jan. 17, 2001, 6 pgs.

Sandberg, E., "An Improved Drive Circuit for an Electrode-Less Plasma Lamp That is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

* cited by examiner

ELECTRODELESS PLASMA LAMP AND DRIVE CIRCUIT

RELATED APPLICATION

This application claims priority to U.S. Provisional Patent Application Ser. No. 61/098,190 entitled ELECTRODELESS PLASMA LAMP AND DRIVE CIRCUIT, filed Sep. 18, 2008, the entire contents of which is incorporated herein by reference.

BACKGROUND

The field relates to systems and methods for generating light, and more particularly to electrodeless plasma lamps.

DETAILED DESCRIPTION OF EXAMPLE EMBODIMENTS

Figure 1A:
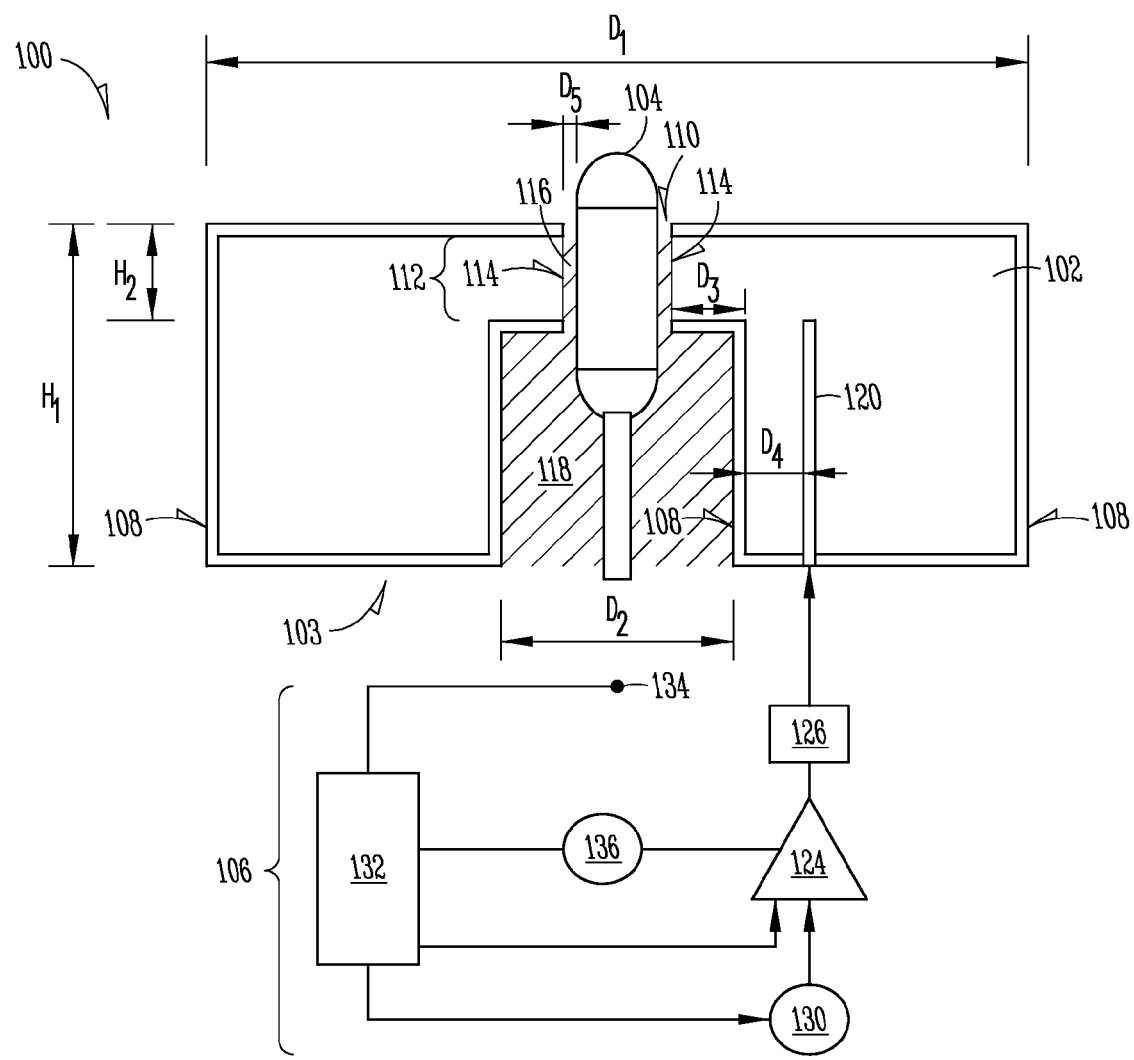
FIG. 1A is a cross-section and schematic view of a plasma lamp according to an example embodiment.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

FIG. 1A is a cross-section and schematic view of a plasma lamp 100 according to an example embodiment. This is an example only and other plasma lamps may be used with other embodiments, including microwave or inductive plasma lamps. In the example of FIG. 1A, the plasma lamp 100 may have a lamp body 102 formed from one or more solid dielectric materials and a bulb 104 positioned adjacent to the lamp body 102. The bulb 104 contains a fill that is capable of forming a light emitting plasma. A lamp drive circuit 106 couples radio frequency (RF) power into the lamp body 102 which, in turn, is coupled into the fill in the bulb 104 to form the light emitting plasma. In example embodiments, the lamp body 102 forms a waveguide that contains and guides the radio frequency power. In example embodiments, the radio frequency power may be provided at or near a frequency that resonates within the lamp body 102. This is an example only and some embodiments may use a different electrodeless plasma lamp, such as a capacitively or inductively coupled plasma lamp, or other high intensity discharge lamp.

The plasma lamp 100 has a drive probe 120 inserted into the lamp body 102 to provide radio frequency power to the lamp body 102. A lamp drive circuit 106 including a power supply, such as an amplifier 124, may be coupled to the drive probe 120 to provide the radio frequency power. The amplifier 124 may be coupled to the drive probe 120 through a low pass filter 126 to provide impedance matching. In an example embodiment, the lamp drive circuit 106 is matched to the load (formed by the lamp body 102, bulb 104 and plasma) for the steady state operating conditions of the lamp 100. The lamp drive circuit 106 is matched to the load at the drive probe 120 using a matching network (not shown).

In example embodiments, radio frequency power may be provided at a frequency in the range of between about 50 MHz and about 10 GHz or any range subsumed therein. The radio frequency power may be provided to drive probe 120 at or near a resonant frequency for lamp body 102. The frequency may be selected based on the dimensions, shape and relative permittivity of the lamp body 102 to provide resonance in the lamp body 102. In example embodiments, the frequency is selected for a fundamental resonant mode of the lamp body 102, although higher order modes may also be used in some embodiments. In example embodiments, the RF power may be applied at a resonant frequency or in a range of from 0% to 10% above or below the resonant frequency or any range subsumed therein. In some embodiments, RF power may be applied in a range of from 0% to 5% above or below the resonant frequency. In some embodiments, the RF power may be provided at one or more frequencies within the range of about 0 to 50 MHz above or below the resonant frequency or any range subsumed therein. In another example, the RF power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the radio frequency power causes the light emitting plasma discharge in the bulb 104. In example embodiments, power is provided by RF wave coupling. In example embodiments, the RF power is coupled at a frequency that forms a standing wave in the lamp body 102 (sometimes referred to as a sustained waveform discharge or microwave discharge when using microwave frequencies). In other embodiments, a capacitively coupled or inductively coupled electrodeless plasma lamp may be used. Other high intensity discharge lamps may be used in other embodiments.

In example embodiments, the electrodeless plasma lamp 100 according to example embodiments may be used in entertainment lighting or architectural lighting or other lighting applications. In particular examples, the lamp 100 is used in moving head entertainment fixtures, fixed spot fixtures, architectural lighting fixtures or event lighting fixtures. Example embodiments may also be used in street and area lighting and other lighting applications.

In some examples, the bulb 104 may be quartz, sapphire, ceramic or other desired bulb material and may be cylindrical, pill shaped, spherical or other desired shape. Other example bulbs that may be used with the lamp 100 are shown in FIGS. 2A and 2B.

Figure 2A:
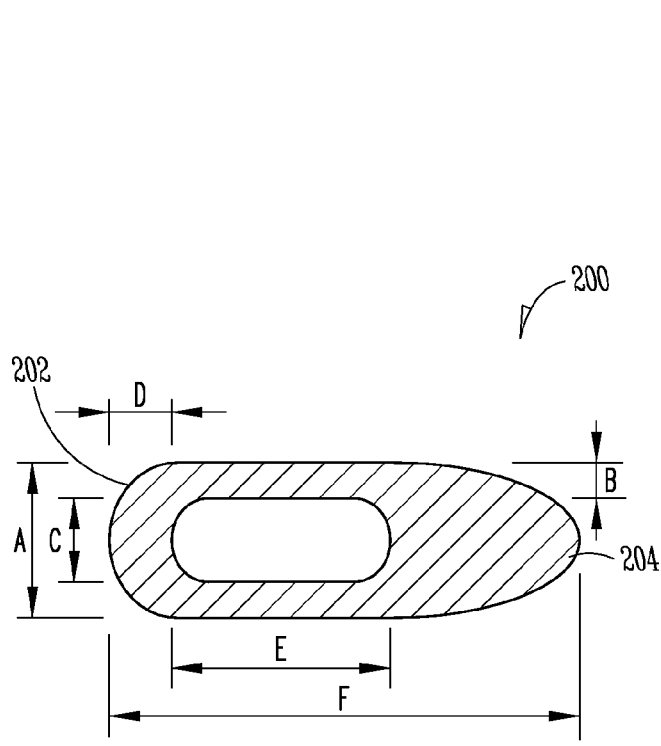
FIG. 2A is a side cross section of a bulb according to an example embodiment.

In an example embodiment shown in FIG. 2A, an example bulb 200 is cylindrical in its center and forms a hemisphere at each end. In one example embodiment, the outer length F (from tip to tip) is about 15 mm and the outer diameter A (at the center) is about 5 mm. In this example, the interior of the bulb 200 (which contains the fill) has an interior length E of about 9 mm and an interior diameter C (at the center) of about 2.2 mm. The wall thickness B is about 1.4 mm along the sides of the cylindrical portion. The wall thickness D at a front end 202 is about 2.25 mm. The wall thickness at the other end 204 is about 3.75 mm. In this example, the interior bulb volume is about 31.42 $mm^3$. In example embodiments where power is provided during steady state operation at between about 150-200 watts (or any range subsumed therein), this results in a power density in the range of about 4.77 watts per $mm^3$ to 6.37 watts per $mm^3$ (4770 to 6370 watts per $cm^3$) or any range subsumed therein. In this example embodiment, the interior surface area of the bulb 200 is about 62.2 $mm^2$ (0.622 $cm^2$) and the wall loading (power over interior surface area) is in the range of about 2.41 watts per $mm^2$ to 3.22 watts per $mm^2$ (241 to 322 watts per $cm^2$) or any range subsumed therein.

In another example embodiment, the interior of the bulb 200 (which contains the fill) has an interior length E of about 9 mm and an interior diameter C (at the center) of about 2 mm. The wall thickness B is about 1.5 mm along the sides of the cylindrical portion. The wall thickness D at the front end 202 (through which light is transmitted out of the lamp 100) is about 2.25 mm. In this example embodiment, the interior bulb volume is about 26.18 $mm^3$. The wall thickness at the other end 204 is about 3.75 mm. In example embodiments where power is provided during steady state operation at between about 150-200 watts (or any range subsumed therein), this results in a power density in the range of about 5.73 watts per $mm^3$ to 7.64 watts per $mm^3$ (5730 to 7640 watts per $cm^3$) or any range subsumed therein. In this example embodiment, the interior surface area of the bulb 200 is about 56.5 $mm^2$ (0.565 $cm^2$) and the wall loading (power over interior surface area) is in the range of about 2.65 watts per $mm^2$ to 3.54 watts per $mm^2$ (265 to 354 watts per $cm^2$) or any range subsumed therein.

Figure 2B:
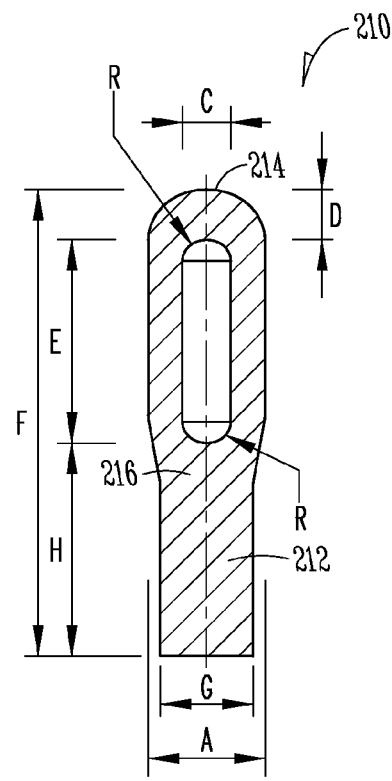
FIG. 2B is a side cross section of a bulb with a tail according to an example embodiment.

In another example embodiment shown in FIG. 2B, a bulb 210 may have a tail 212 extending from one end of the bulb 210. In some embodiments, the length of the tail 212 (indicated at H in FIG. 2B) may be between about 2 mm and 25 mm or any range subsumed therein. In some example embodiments, a longer or shorter tail 212 may be used. In one example embodiment, the length of the tail 212, H, is about 9.5 mm. In this example embodiment, the outer length of the bulb 210 (excluding the tail 212) is about 15 mm and the outer diameter A (at the center) is about 5 mm. In this example embodiment, the interior of the bulb 210 (which contains the fill) has an interior length E of about 9 mm and an interior diameter C at the center) of about 2.2 mm. The wall thickness B is about 1.4 mm along the sides of the cylindrical portion. The wall thickness D at the front end 202 is about 2.25 mm. The radius R is about 1.1 mm. In this example embodiment, the interior bulb volume is about 31.42 $mm^3$. The tail 212 may be formed by a quartz tube used to form the bulb 104. In an example embodiment, the tube is sealed at one end which forms the front end 214 of the bulb 210. The bulb 210 is filled through the open end of the tube and sealed. The sealed tube is then placed in a liquid nitrogen bath and a torch is used to collapse the tube at the other end 216 of the lamp 100, which seals the bulb 210 and forms the tail 212. The collapsed tube is then cut for the desired tail length.

In another example embodiment as shown in FIG. 2B, the bulb inner shape may be a nominal cylinder with two hemispheres at the ends having about the same radius as the cylindrical part. In this example, the inner length E is about 12 mm, the inner diameter C is about 4 mm (with an inner radius of about 2 mm), the outer diameter A is about 7 mm (with an outer radius of about 3.5 mm), and the length of the bulb 210 (excluding the tail) is about 17 mm. In this example, the length H of the tail 212 is about 9 mm.

In some example embodiments, the tail 212 may be used as a light guide or pipe to sense the level of light in the bulb 210. This may be used to determine ignition, peak brightness or other state information regarding the lamp 100. Light detected through the tail 212 can also be used by the drive circuit 106 for dimming and other control functions. For example, as shown in FIG. 1A, the tail 212 extends from the bulb 210 to a back 103 of the lamp 100 proximate the photodiode 134 or other photosensor. The photodiode 134 can sense light from the bulb 210 through the tail 212. The level of light can then be used by the drive circuit 106 to control operation of the lamp 100. The back 103 of the lamp 100 can be enclosed by a cover to avoid interference from external light from the surrounding environment. This isolates the region where light is detected by the photodiode 134 and helps avoid interference that might be present if light is detected from the front of the lamp 100.

Figure 2C:
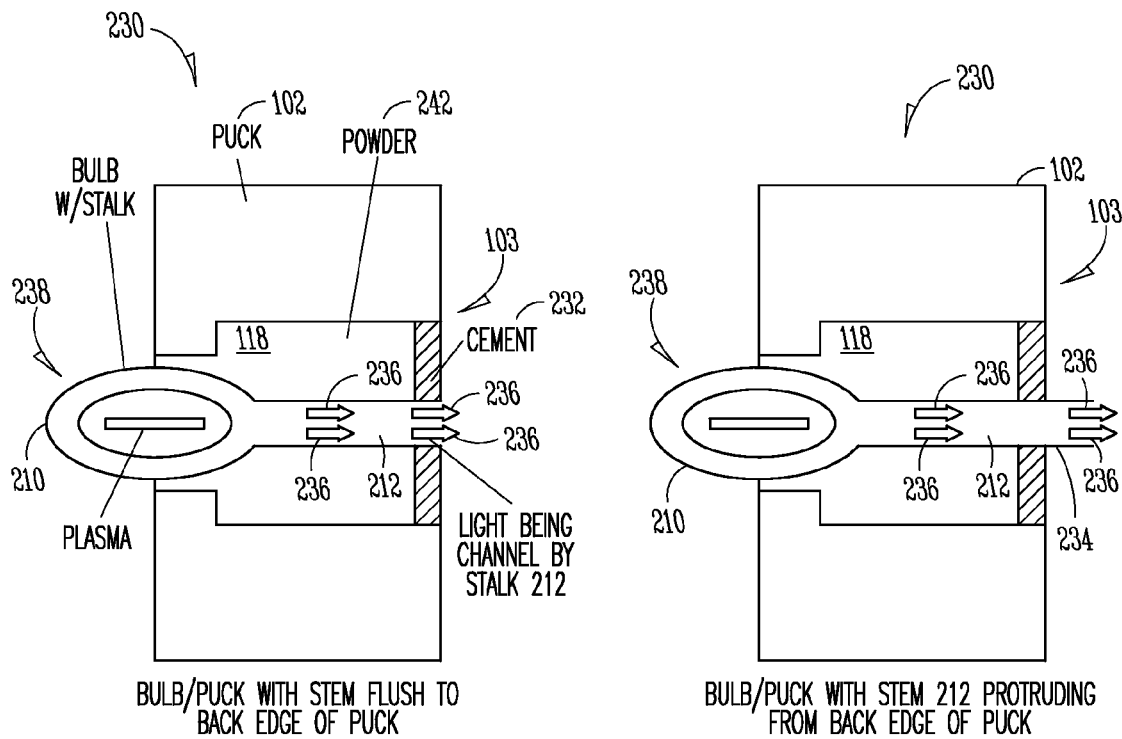
FIG. 2C illustrates example embodiments in which a bulb tail is used as a light pipe for light detection.
Figure 2D:
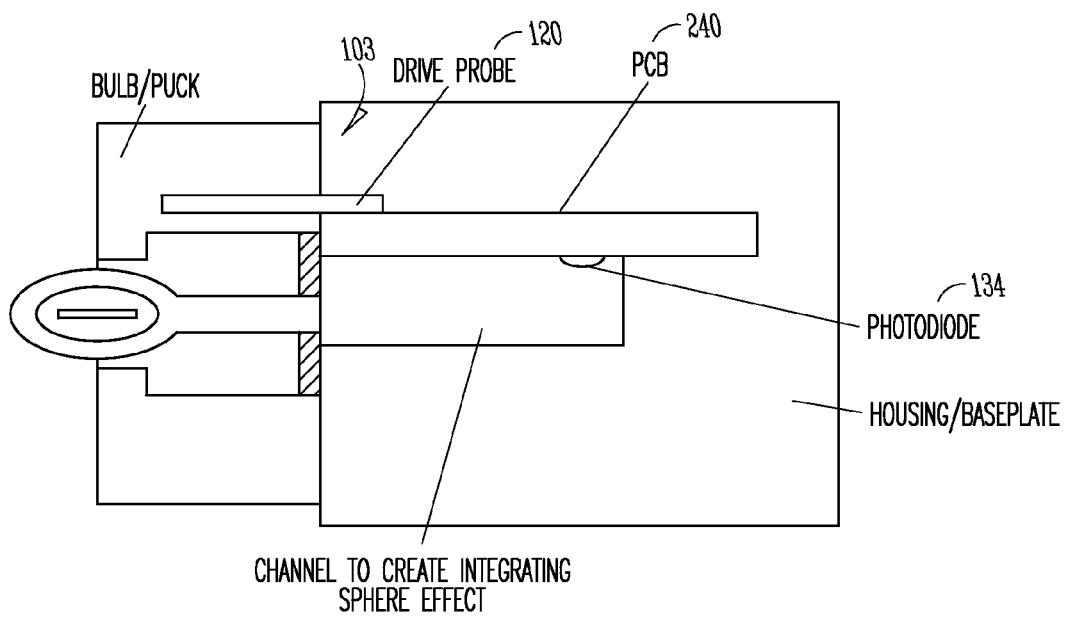
FIG. 2D illustrates an example embodiment where light is collected through a tail and a channel formed in a base plate for a printed circuit with a photodiode.

Example embodiments of a tail being used as a light pipe are shown in FIG. 2C. As shown in FIG. 2C, the tail 212 (labeled "stalk" in FIG. 2C) may be extended to sit flush with or extend just past the edge of the ceramic lamp body 102 (labeled "puck" in FIG. 2C). Cement 232 is then applied as shown such that the end 234 of the tail 212 is left exposed. The tail 212 acts as a light guide or pipe to direct a fraction of the light from the plasma in the bulb 210 in the direction 236 shown in FIG. 2C. This light is directly proportional to the total light coming out of the bulb 210 in the front 238. FIG. 2D shows an example embodiment of how the bulb/puck can then be mounted to a printed circuit board (PCB) 240 that contains the drive probe 120 and all or part of the lamp drive circuit 106.

A tunnel or channel may be created in the housing/baseplate under the PCB 240. The photodiode 134 can be mounted on the backside of the PCB 240 as shown in FIG. 2D. Mounting of the photodiode 134 in this way will shield the photodiode 134 from the RF power present near the bulb/puck. In order to decrease the alignment sensitivity of the photodiode 134 to the light source, the light from the source (tail end of the bulb 210) may be homogenized. One way to homogenize a light distribution is by using a light pipe. Multiple reflections from the walls of the light pipe either by total internal reflection for a solid light pipe or by wall reflection for a hollow light pipe provides integration of the light from the light pipe entrance face, i.e. a highly inhomogeneous intensity distribution at the entrance face of the light pipe will be homogeneous at the exit face. The longer the light pipe the more uniform the intensity distribution will be. Typically 5 to 6 reflections of the highest angle of incidence for the light of interest are sufficient to achieve good homogeneity. In example embodiments, the channel in the aluminum housing that guides the light emitting from the tail end of the bulb 210 to the photodiode 134 acts like a light pipe and provides homogenization thus decreasing alignment sensitivity.

In some example embodiments, the tail 212 may be used to align the bulb 210 and mount it in position. For example, the recess 118 may be packed with alumina powder 242. A plate or cement 232 or other material may be used to cover the back of the recess 118 and hold the powder 242 in place. This layer may form a rigid structure to which the bulb tail 212 may be mounted and fixed in position relative to the lamp body 210. For example, the layer of cement 232 may be placed across the back surface of the powder 242 and the tail 212 of the bulb 210 may be placed in the cement before it is cured. The cured cement holds the bulb 210 in place and forms a rigid layer that is fixed in position relative to the lamp body 102. In some example embodiments, the tail 212 may also provide additional heat sinking to the back end of the bulb 210. To the extent that the dose amounts result in a condensed pool of metal halide during lamp operation, the tail 212 helps form the pool at the cooler region at the back of the bulb 210, rather than at the front of the bulb 210 through which light is transmitted out of the lamp 100.

In other example embodiments, the bulb 210 may have an interior width or diameter in a range between about 2 and 30 mm or any range subsumed therein, a wall thickness in a range between about 0.5 and 4 mm or any range subsumed therein, and an interior length between about 2 and 30 mm or any range subsumed therein. In example embodiments, the interior bulb volume may range from 10 $mm^3$ and 750 $mm^3$ or any range subsumed therein. In some embodiments, the bulb volume is less than about 100 $mm^3$. In example embodiments where power is provided during steady state operation at between about 150-200 watts, this results in a power density in the range of about 1.5 watts per $mm^3$ to 2 watts per $mm^3$ (1500 to 2000 watts per $cm^3$) or any range subsumed therein. In this example embodiment, the interior surface area of the bulb 210 is about 55.3 $mm^2$ (0.553 $cm^2$) and the wall loading (power over interior surface area) is in the range of about 2.71 watts per $mm^2$ to 3.62 watts per $mm^2$ (271 to 362 watts per $cm^2$) or any range subsumed therein. In some embodiments, the wall loading (power over interior surface area) may be 1 watts per $mm^2$ (100 watts per $cm^2$) or more. These dimensions are examples only and other embodiments may use bulbs having different dimensions. For example, some embodiments may use power levels during steady state operation of 400-500 watts or more, depending upon the target application.

In example embodiments, the bulb 210 contains a fill that forms a light emitting plasma when radio frequency power is received from the lamp body 102. The fill may include a noble gas and a metal halide. Additives such as Mercury may also be used. An ignition enhancer may also be used. A small amount of an inert radioactive emitter such as $Kr_{85}$ may be used for this purpose. Some example embodiments may use a combination of metal halides to produce a desired spectrum and lifetime characteristics. In some example embodiments, a first metal halide is used in combination with a second metal halide. In some example embodiments, the first metal halide is Aluminum Halide, Gallium Halide, Indium Halide, Thallium Halide and Cesium Halide and the second metal halide is a halide of a metal from the Lanthanide series. In example embodiments, the does amount of the first metal halide is in the range of from about from 1 to 50 micrograms per cubic millimeter of bulb volume, or any range subsumed therein and the dose amount of the second metal halide is in the range of from about from 1 to 50 micrograms per cubic millimeter of bulb volume, or any range subsumed therein. In some embodiments, the dose of the first metal halide and the dose of the second metal halide are each in the range of from about 10 to 10,000 micrograms or any range subsumed therein. In example embodiments, these dose amount result in a condensed pool of metal halide during lamp operation. A noble gas and additives such as Mercury may also be used. In example embodiments, the dose amount of Mercury is in the range of 10 to 100 micrograms of Mercury per $mm^3$ of bulb volume, or any range subsumed therein. In some embodiments, the dose of Mercury may be in the range of from about 0.5 to 5 milligrams or any range subsumed therein. An ignition enhancer may also be used. A small amount of an inert radioactive emitter such as $Kr_{85}$ may be used for this purpose. In some example embodiments, $Kr_{85}$ may be provided in the range of about 5 nanoCurie to 1 microCurie or any range subsumed therein.

In a particular example embodiment, the fill includes the first metal halide as an Iodide or Bromide in the range from about 0.05 mg to 0.3 mg or any range subsumed therein, and the second metal halide as an Iodide or Bromide in the range from about 0.05 mg to 0.3 mg or any range subsumed therein. Chlorides may also be used in some embodiments. In some example embodiments, the first metal halide and the second metal halide are provided in equal amounts. In other embodiments, the ratio of the first metal halide to the second metal halide may be 10:90, 20:80, 30:70, 40:60, 60:40, 70:30, 80:20 or 90:10.

In some example embodiments, the first metal halide is Aluminum Halide, Gallium Halide, Indium Halide or Thallium Halide (or a combination of Aluminum Halide, Gallium Halide, Indium Halide and/or Thallium Halide). In some example embodiments, the first metal halide may be Cesium Halide (or Cesium Halide in combination with Aluminum Halide, Gallium Halide, Indium Halide and/or Thallium Halide). In other example embodiments, the dose does not include any Alkalai metals. In some example embodiments, the second metal halide is Holmium Halide, Erbium Halide or Thulium Halide (or a combination of one or more of these metal halides). In these example embodiments, the first metal halide may be provided in a dose amount in the range of about 0.3 mg/cc to 3 mg/cc or any range subsumed therein and the second metal halide may be provided in a dose amount in the range of about 0.15 mg/cc to 1.5 mg/cc or any range subsumed therein. In some example embodiments, the first metal halide may be provided in a dose amount in the range of about 0.9 mg/cc to 1.5 mg/cc or any range subsumed therein and the second metal halide may be provided in a dose amount in the range of about 0.3 mg/cc to 1 mg/cc or any range subsumed therein. In some example embodiments, the first metal halide is provided in a larger dose amount than the second metal halide. In some examples, the first metal halide is Aluminum Bromide or Indium Bromide and the second metal halide is Holmium Bromide. In some example embodiments, the fill also includes Argon or another noble gas at a pressure in the range of about 50 to 760 Torr or any range subsumed therein. In some example embodiments, the pressure is 100 Torr or more or 150 Torr or more or may be at higher pressures as described below. In one example, Argon at 150 Torr may be used. Mercury and an inert radioactive emitter such as $Kr_{85}$ may also be included in the fill. In some example embodiments, a power of 100 watts or more may be provided to the lamp 100. In some example embodiments, the power is in the range of about 150 to 200 watts, with 170 watts being used in a particular example. The wall loading may be 1 watts per $mm^2$ (100 watts per $cm^2$) or more. A thermally conductive material, such as alumina powder, may be in contact with the bulb 210 to allow high wall loading to be used as described below. In some example embodiments, as described further below, these fills may be used to provide 15,000 to 20,000 lumens (or any range subsumed therein) when operated at 150 to 200 watts (or any range subsumed therein). This can provide a luminous efficiency of 100 lumens per watt or more in some embodiments. Example embodiments may also provide at a correlated color temperature of 4000 to 10000 K (or any range subsumed therein) with a bulb geometry enabling the collection of 4500 to 5500 lumens (or any range subsumed therein) in 27 mm2 steradian when operated at 150 to 200 watts (or any range subsumed therein). In some example embodiments, the fill may be selected to provide a correlated color temperature in the range of 6000 to 9000 K.

Other metal halides may also be used in other example embodiments, including Bromides, Iodides and Chlorides of Indium, Aluminum, Gallium, Thallium, Holmium, Dysprosium, Cerium, Cesium, Erbium, Thulium, Lutetium and Gadolinium. Other metal halides may also be used in other embodiments, including Bromides, Iodides and Chlorides of Sodium, Calcium, Strontium, Yttrium, Tin, Antimony, Thorium and any of the elements in the Lanthanide series.

Some example embodiments may use a combination of metal halides to produce a desired spectrum. In some examples, one or more metal halides with strong emission in the blue color range (such as halides of Aluminum, Cesium, Gallium, Indium and/or Scandium) may be combined with one or more metal halides to enhance emission in the red color range (such as halides of Sodium, Calcium, Strontium, Gadolinium, Dysprosium, Holmium, Erbium and/or Thulium). In particular example embodiments, the fill may include (1) Aluminum Halide and Holmium Halide; (2) Aluminum Halide and Erbium Halide; (3) Gallium Halide and Holmium Halide; (4) Gallium Halide and Erbium Halide; (5) any of these fill further including Indium Halide; (6) any of these fills further including an alkali metal halide such as Sodium Halide or Cesium Halide (although other examples may specifically exclude all alkali metals); and (7) any of these fills further including Cerium Halide.

In an example embodiment, the metal halide(s) may be provided in the range from about 0.01 mg to 10 mg or any range subsumed therein and Mercury may be provided in the range of about 0.01 to 10 mg or any range subsumed therein. In example embodiments, the fill includes 1 to 100 micrograms of metal halide per $mm^3$ of bulb volume, or any range subsumed therein, 1 to 100 micrograms of Mercury per $mm^3$ of bulb volume, or any range subsumed therein, and 5 nanoCurie to 1 microCurie of a radioactive ignition enhancer, or any range subsumed therein. In other examples, the fill may include a dose of one or more metal halides in the range of about 1 to 100 micrograms of metal halide per $mm^3$ of bulb volume without Mercury. In some embodiments using more than one metal halide, the total dose may be in any of the above ranges and the percentage of each metal halide may range from 5% to 95% of the total dose or any range subsumed therein.

These doses are examples only and other embodiments may use different doses and/or different fill materials. In other embodiments, different fills such as Sulfur, Selenium or Tellurium may also be used. In some examples, a metal halide such as Cesium Bromide may be added to stabilize a discharge of Sulfur, Selenium or Tellurium. Metal halide may also be added to a fill of Sulfur, Selenium or Tellurium to change the spectrum of the discharge.

In some example embodiments, a high pressure fill is used to increase the resistance of the gas. This can be used to decrease the overall startup time required to reach full brightness for steady state operation. In one example, a noble gas such as Helium, Neon, Argon, Krypton or Xenon, or another substantially non-reactive gas such as Nitrogen, or a combination of these gases is provided at high pressures between 200 Torr to 3000 Torr or any range subsumed therein. Pressures less than or equal to 760 Torr may be desired in some embodiments to facilitate filling the bulb at or below atmospheric pressure. In particular embodiments, pressures between 400 Torr and 600 Torr are used to enhance starting. Example high pressure fills may also include metal halide (or a combination of metal halides as described above) and Mercury which have a relatively low vapor pressure at room temperature. Example metal halide and Mercury fills include, but are not limited to, the fills described in Table 1 below. A bulb as described in connection with FIG. 2A or FIG. 2B may be used with these fills in example embodiments. In one example, the bulb 200, 210 has a volume of about 31.42 $mm^3$ as described above.

TABLE 1

| Fill | InBr | $DyI_3$ | $CeI_3$ | $HoBr_3$ | $AlBr_3$ | $ErBr_3$ | $GdI_3$ | $HoI_3$ | Hg |
|---|---|---|---|---|---|---|---|---|---|
| #1 | 0.1 mg | 0.1 mg | 0 | 0 | 0 | 0 | 0 | 0 | 2.7 mg |
| #2 | 0.1 mg | 0 | 0.1 mg | 0 | 0 | 0 | 0 | 0 | 2.7 mg |
| #3 | 0 | 0 | 0 | 0.05 mg | 0.05 mg | 0 | 0 | 0 | 1.35 mg |
| #4 | 0.1 mg | 0 | 0 | 0 | 0.1 mg | 0 | 0 | 0 | 2.7 mg |
| #5 | 0.1 mg | 0 | 0 | 0 | 0 | 0 | 0.1 mg | 0 | 2.7 mg |
| #6 | 0.1 mg | 0 | 0 | 0 | 0 | 0 | 0 | 0.1 mg | 2.7 mg |
| #7 | 0.1 mg | 0 | 0 | 0 | 0 | 0 | 0 | 0 | 1.6 mg |
| #8 | 0 | 0 | 0 | 0 | 0.05 mg | 0.05 mg | 0 | 0 | 1.35 mg |
| #10 | 0.03 mg | 0 | 0 | 0.01 mg | 0 | 0 | 0 | 0 | 1.4 mg |
| #11 | 0.03 mg | 0 | 0 | 0.03 mg | 0 | 0 | 0 | 0 | 1.4 mg |
| #12 | 0.05 mg | 0 | 0 | 0.01 mg | 0 | 0 | 0 | 0 | 1.4 mg |
| #13 | 0.05 mg | 0 | 0 | 0.03 mg | 0 | 0 | 0 | 0 | 1.4 mg |

In example embodiments, these dose amount result in a condensed pool of metal halide during lamp operation. These fills can also be used without Mercury in some embodiments. In these examples, Argon or Krypton is provided at a pressure in the range of about 50 Torr to 760 Torr, depending upon desired startup characteristics. Some embodiments may use higher pressures. Initial breakdown of the noble gas is more difficult at higher pressure, but the overall warm up time required for the fill to substantially vaporize and reach peak brightness is reduced. The above fills may be used with or without an ignition enhancer. In some embodiments, these fills include $Kr_{85}$ in the range of about 5 nanoCurie to 1 microCurie or any range subsumed therein. Higher levels of ignition enhancer can be used to provide almost instantaneous ignition. The above pressures are measured at 22° C. (room temperature). It is understood that much higher pressures are achieved at operating temperatures after the plasma is formed. For example, the lamp 100 may provide a high intensity discharge at high pressure during operation (e.g., greater than 2 atmospheres and 10-100 atmospheres or more in example embodiments or any range subsumed therein). These pressures and fills are examples only and other pressures and fills may be used in other embodiments.

In a particular example embodiment, the fill includes about 0.42 μliter of Hg, about 0.05 mg of InBr, and about 0.01 mg of HoBr3. In this example, with reference to FIG. 2B, the bulb inner shape may be a nominal cylinder with two hemispheres at the ends 214, 216 having about the same radius as the cylindrical part, the inner length E is about 12 mm, the inner diameter C is about 4 mm (with an inner radius of about 2 mm), the outer diameter A is about 7 mm (with an outer radius of about 3.5 mm), and the length of the bulb 210 (excluding the tail 212) is about 17 mm. In this example, the length of the tail H is about 9 mm.

In another example, the bulb 210 has a volume of about 31.42 mm cubed and the fill includes 0.01 milligram of InBr and 0.005 mg of HoBr3. In another example embodiment, the bulb 212 has a volume of about 31.42 mm cubed and the fill includes 0.01 milligram of InBr and 0.005 mg of ErBr3. These fills may also include 1.4 mg of Mercury or may be Mercury free in some example embodiments. The fill may also include $Kr_{85}$ as an ignition enhancer in the does ranges described above. In this example embodiment, Argon or Krypton is provided at a pressure in the range of about 100 Torr to 200 Torr, depending upon desired startup characteristics. Some embodiments may use higher or lower pressures. Initial breakdown of the noble gas is more difficult at higher pressure, but the overall warm up time required for the fill to substantially vaporize and reach peak brightness is reduced.

Figure 2E:
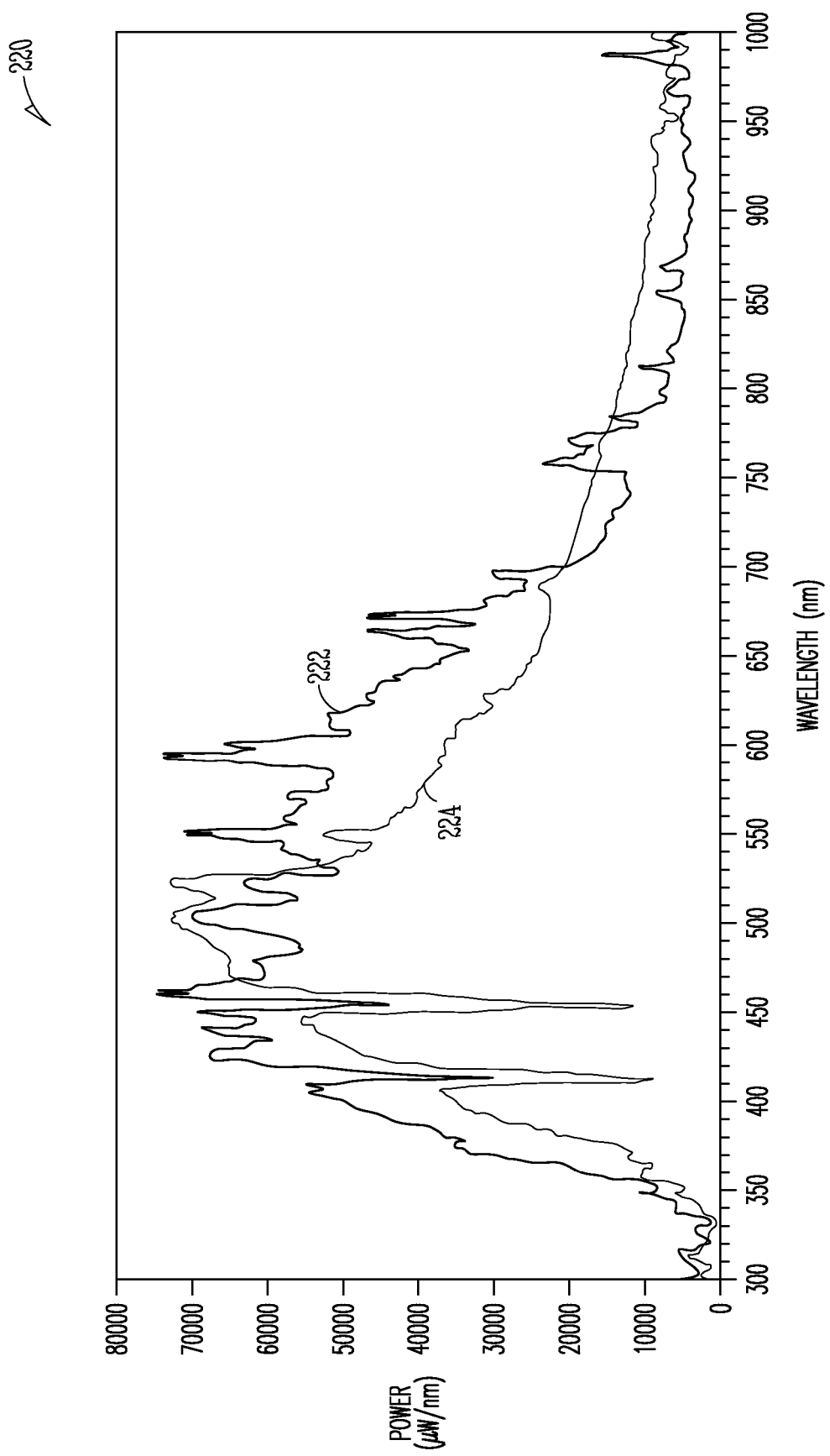
FIG. 2E illustrates a graph of a spectrum produced by a fill according to an example embodiment.

FIG. 2E shows a graph 220 of an example spectral power distribution 222 for the lamp 100 shown in FIG. 1A containing the example InBr/HoBr3 fill in microwatts per nanometer as collected in 27 $mm^2$ steradian at about 140 W operating power provided to the lamp 100. The graph 220 also shows an example spectral power distribution 224 for an Indium Bromide fill for comparison. As shown in FIG. 2E, the Indium/Holmium fill provides a brighter and more balanced spectrum. For example, the total radiated power between about 300-1000 nm collected in 27 $mm^2$ steradian at about 140 W operating power provided to the lamp 100 is about 20.2 watts compared to 17.2 watts for Indium Bromide alone. In the range of 320 nm to 400 nm (part of the near UV spectrum, which may be useful for fluorescence excitation) the collected radiated power is about 1.8 watts for the In/Ho fill and 1.02 watts for In only. In the range of 400 nm to 700 nm (for visible illumination) the collected radiated power is about 15.9 watts for the In/Ho fill and 12.7 watts for In only. Each of the above can be expressed as a percentage of the total collected radiated power from 300 to 1000 nm in 27 $mm^2$ steradian and also as a percentage of input power to the lamp 100 (in this case about 140 watts). Also, the color rendering for the Indium/Holmium fill is greater than 95% (about 97% in some embodiments) compared to 85% to 89% for Indium only fills. In example embodiments, the above characteristics are obtained for collected light in 30 $mm^2$ steradian or less.

The plasma arc produced in example embodiments is stable with low noise. Power is coupled symmetrically into the center region of the bulb 104 from the lamp body 102 and is not disturbed by electrodes in the bulbs 104, 200, 210 (or degradation of those electrodes).

The drive circuit 106 and operation of the example lamp 100 will now be described by way of example with reference to FIG. 1A and FIG. 3. The drive circuit 106 includes a voltage controlled oscillator (VCO) 130, a multi-stage amplifier 124, a low pass filter 126, a current sensor circuit 136, a microprocessor 132 or other controller, and the photodiode 134 or other photosensor. The VCO 130 is used to provide radio frequency power to the lamp 100 at a desired frequency under control of the microprocessor 132. The radio frequency power is amplified by the amplifier 124 and provided to the lamp body 102 through the low pass filter 126. The current sensor 136 is used to detect the level of current to determine the state of operation of the lamp 100. In addition, the photodiode 134 detects the level of light through the tail 212 of bulb 210 for use in determining the state of operation of the lamp 100. The microprocessor 132 uses the information from the current sensor circuit 136 and the photodiode 134 to control the VCO 130 and the amplifier 124 during startup and operation of the lamp 100 including startup, steady state operation and dimming and other control functions.

The power to the lamp body 102 may be controlled by the drive circuit 106 to provide a desired startup sequence for igniting the plasma. As the plasma ignites and heats up during the startup process, the impedance and operating conditions of the lamp 100 change. In order to provide for efficient power coupling during steady state operation of the lamp 100, the lamp drive circuit 106 is impedance matched to the steady state load of the lamp body 102, bulb 210 and plasma after the plasma is ignited and reaches steady state operating conditions. This allows power to be critically coupled from the drive circuit 106 to the lamp body 102 and plasma during steady state operation. However, the power from the drive circuit 106 is overcoupled to the lamp body 102 at ignition and during warm up of the plasma.

Figure 3:
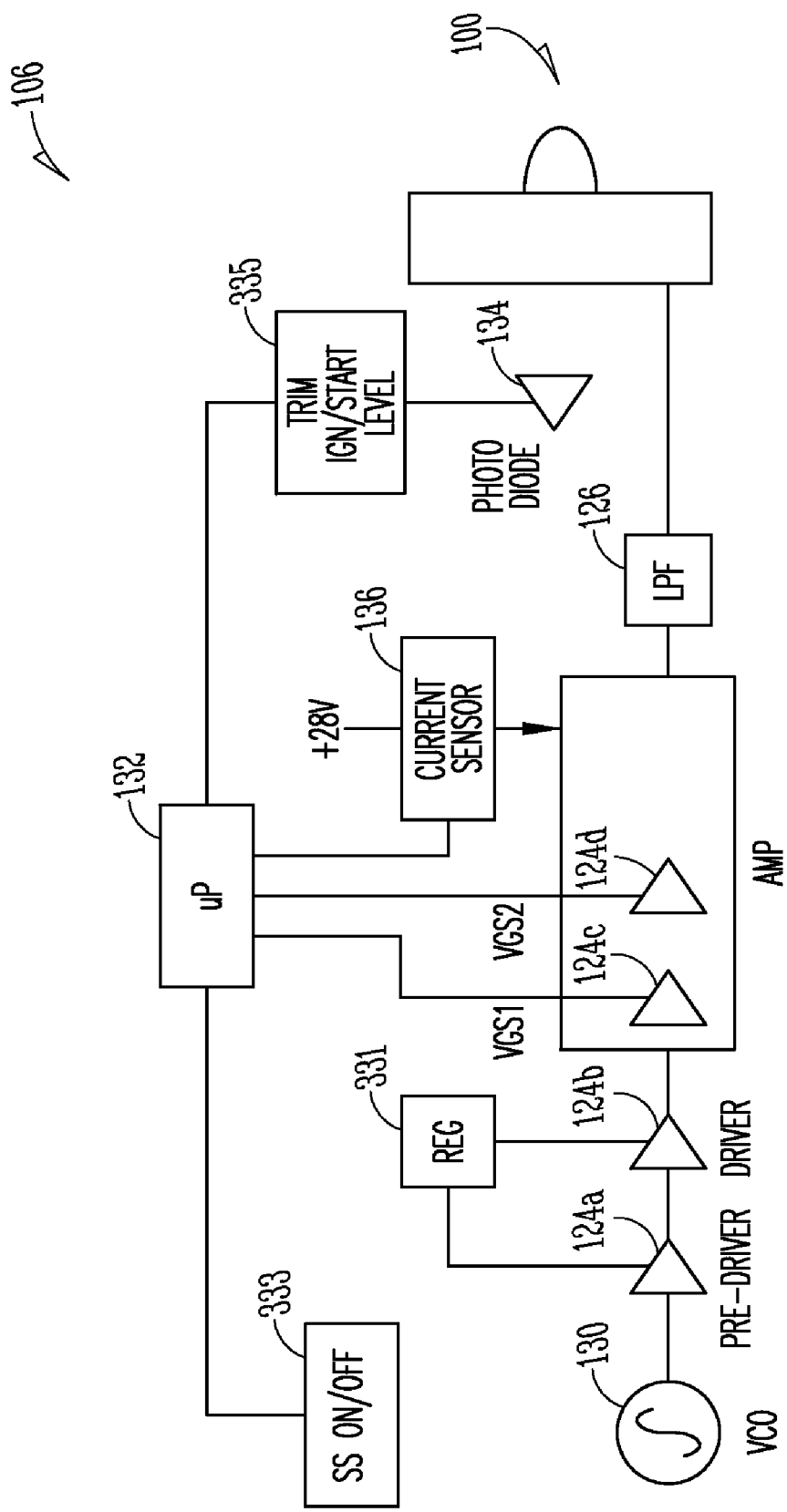
FIG. 3 is a block diagram of a drive circuit for an electrodeless plasma lamp according to an example embodiment.

As shown in FIG. 3, the VCO 130 provides RF power at a desired frequency to the multi-stage amplifier 124. In this example, the amplifier 124 has a pre-driver 124a, a driver 124b and two additional gain stages 124c and 124d controlled by the microprocessor 132. The amplified RF power is provided to the probe 120 inserted into the lamp body 102 through the low pass filter 126. A current sensor circuit 136 samples current in the drive circuit and provides information regarding the current to the microprocessor 132. The photodiode 134 senses light output from the bulb 210 (through the tail 212) and provides information regarding the light intensity to the microprocessor 132. The microprocessor 132 uses these inputs to control the gain Vgs1 and Vgs2 of gain stages 124c and 124d of the amplifier 124. The microprocessor 132 also uses this information to control the frequency of the VCO 130. A spread spectrum circuit 333 between the microprocessor 132 and the VCO 130 can be used to adjust the signal to the VCO 130 to spread the frequencies over a range to reduce EMI as described below. Regulator (Reg) 331 is used to control the gain of the pre-driver 124a and driver 124b which may be fixed or programmable manually or by the microprocessor 132 in example embodiments.

During ignition, the microprocessor 132 ramps the VCO 130 through a series of frequencies until ignition is detected from the photodiode 134. The microprocessor 132 also adjusts Vgs1 and Vgs2 based on the current sensor circuit 136 to maintain the desired current level in the circuit. Once a threshold level of light is detected indicating ignition, the microprocessor 132 enters a warm up state. During warm up, the microprocessor 132 ramps the VCO frequency down through a pre-defined range and keeps track of the light output intensity from the photodiode 134 at each frequency. It then adjusts the frequency to the level determined to have the highest intensity. Once the photodiode 134 senses another threshold level of light indicating completion of warm up, the microprocessor 132 enters a run state. In the run state, the microprocessor 132 adjusts the frequency up and down in small increments to determine whether the frequency should be adjusted to achieve a target light level with the minimum current.

The lamp 100 can also be dimmed to low light levels less than 10%, 5% or 1% of peak brightness or even less in some embodiments. In some embodiments, upon receiving a dimming command, the microprocessor 132 can adjust Vgs1 and Vgs2 to adjust the gain of the amplifiers 124 to dim the lamp 100. The microprocessor 132 also continues to make small adjustments in frequency to optimize the frequency for the new target light output level.

In an alternate embodiment, the lamp 100 can be dimmed using pulse width modulation. The power may be pulsed on and off at high frequency at different duty cycles to achieve dimming. For example, in some examples, pulse width modulation may occur at a frequency of 1 kHz to 1000 kHz or any range subsumed therein. In one example, a pulsing frequency of about 10 kHz is used. This provides a period of about 0.1 millisecond (100 microseconds). In another example, a pulsing frequency of about 500 kHz is used. This provides a period of about 2 microseconds. In other examples, the period may range from about 1 millisecond (at 1 kHz) to 1 microsecond (at 1000 kHz) or any range subsumed therein. However, the plasma response time is slower, so the pulse width modulation does not turn the lamp off. Rather, the average power to the lamp body 102 can be reduced by turning the power off during a portion of the period according to a duty cycle. For example, the microprocessor 132 may turn off the VCO 130 during a portion of the period to lower the average power provided to the lamp body 102. Alternatively, an attenuator may be used between the VCO 130 and the amplifier 124 to turn off the power. In other embodiments, the microprocessor 132 may switch on and off one of the low-power gain stages of the multi-stage amplifier 124, such as the pre-driver 124a. For example, if the duty cycle is 50%, the power will be off half of the time and the average power to the lamp body 102 will be cut in half (resulting in dimming of the lamp 100).

This may be advantageous over dimming by adjusting Vgs1 and Vgs2 in some embodiments, because the amplifier 124 can be kept in a more efficient operating range when power is applied. For example, when the power is on during the duty cycle, the amplifier 124 remains closer to peak power and/or saturation rather than operating the amplifier 124 at lower gain and efficiency for dimming. In example embodiments, the duty cycle may range from 1%-99% or any range subsumed therein. In some embodiments, when complete dimming is desired (no light output), the lamp 100 may be dimmed to a low level (for example 1-5% of full brightness or less in some embodiments) using pulsing and a mechanical shutter can be used to block the light. In this example, the lamp 100 remains ignited, so it can rapidly be brought back up to full brightness (which may be desirable in various applications such as entertainment lighting). In some embodiments, the steady state power (even when the lamp 100 is not dimmed) may also use pulsing according to a duty cycle. The peak power of the amplifier 124 can be higher than the desired steady state operating conditions and pulsing can be used to reduce the average power to the desired level while maintaining amplifier efficiency.

In some examples, a power level to the amplifier 124 may be used that causes the amplifier 124 to operate at 70% to 95% efficiency or any range subsumed therein. In particular, in example embodiments, the high gain stage(s) of the amplifier 124, such as output stage 124d (and/or stage 124c), may operate at 70% to 95% efficiency or any range subsumed therein. In example embodiments, the efficiency of the amplifier 124 (or high gain stage(s)) may be in the range of from about 70% to 100% of its peak efficiency or any range subsumed therein. In some examples, the power level may cause the amplifier 124 (and/or one or more high gain stage(s)) to operate at or near saturation. In some embodiments, the power level may be in the range of from about 70% to 100% or more of the power level required for saturation or any range subsumed therein. By pulsing the power at these levels, desired efficiency and operating conditions of the amplifier 124 may be maintained during dimming (or steady state operation in some embodiments) even when the efficiency and operating conditions would not be obtained if the power level was dropped to the same average power without pulsing. By keeping the amplifier 124 (or high gain stage(s) of the amplifier) in an efficient range and pulsing the power, the overall efficiency of the lamp 100 can be improved in some embodiments.

The operation of an example lamp 100 and the drive circuit 106 during startup will now be described by way of example with reference to a method 400 shown in FIGS. 4A-G. Various start and threshold values used by the microprocessor 132 to control the lamp 100 may be determined empirically in advance when the lamp 100 is tested and configured. These values may be programmed into the microprocessor 132 and memory ahead of time and used as described below.

Figure 4A:
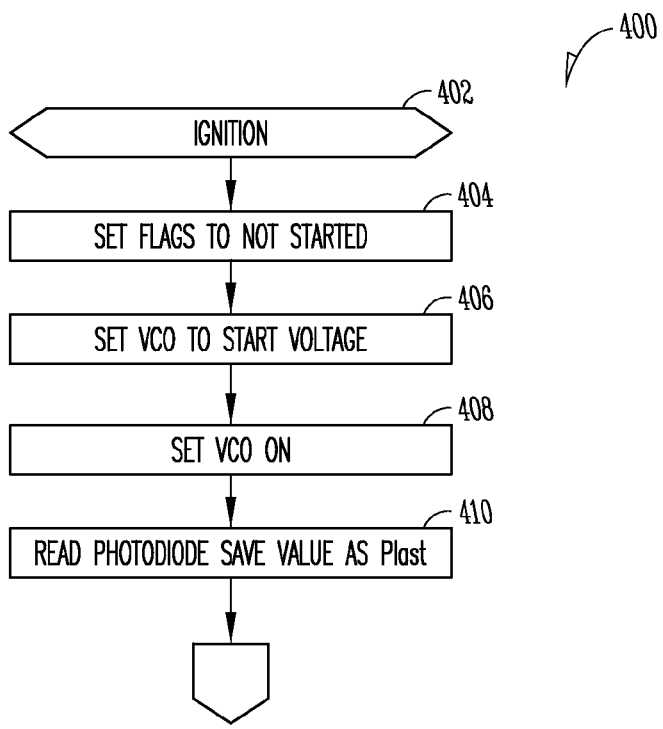
FIGS. 4A-G are flow charts of a method for starting an electrodeless plasma lamp according to an example embodiment.

As shown in FIG. 4A, for ignition mode (see block 402), the microprocessor 132 sets internal flags in memory (not shown) to indicate that the lamp 100 has not started (see block 404). It then sets the control voltage on the VCO 130 to the desired level for startup (see block 406) and turns the VCO 130 on (see block 408). As shown at block 410, the microprocessor 132 then reads photodiode 134 and saves the value (Plast) in memory. This value measures any ambient light prior to ignition of the lamp 100.

Figure 4B:
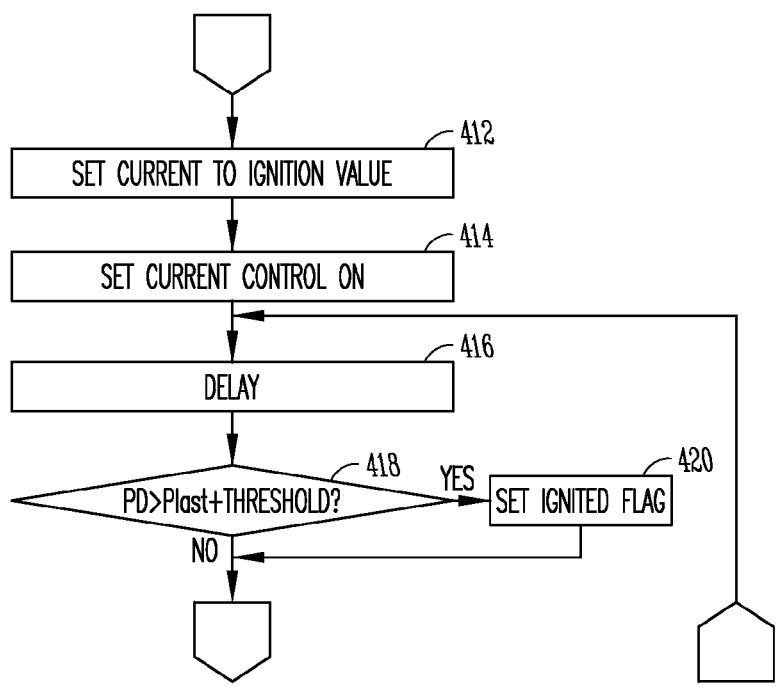

As shown in blocks 412 and 414 in FIG. 4B, the microprocessor 132 then sets Vgs1 and Vgs2 to control the current in the circuit (as sensed by current sensor 136). After a delay shown in block 416, and as shown at block 418, Vgs1 and Vgs2 are set at a level that provides a desired current during ignition. The microprocessor 132 then reads the photodiode and determines whether the value is above a threshold over the ambient (Plast) which indicates ignition of the lamp 100. Upon ignition, the microprocessor 132 sets an ignited flag (see block 420) in memory to indicate that the fill in the bulb 104 has ignited.

Figure 4C:
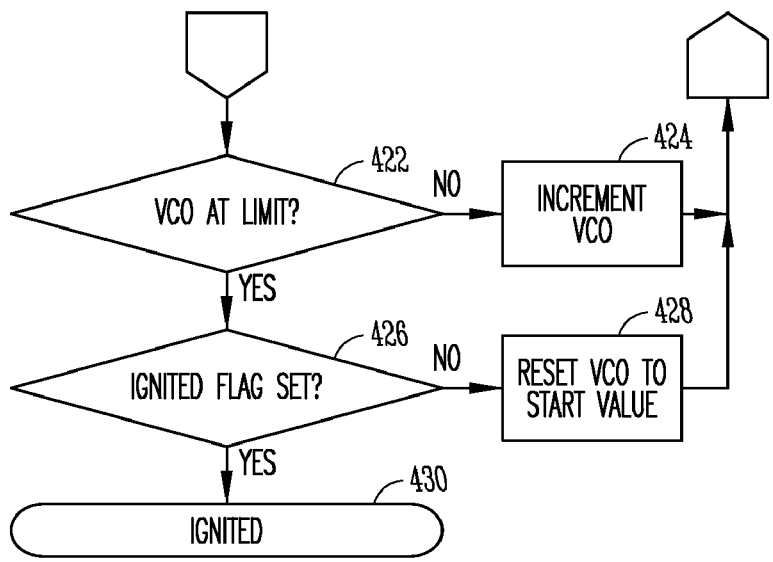

As shown at FIG. 4C, the microprocessor 132 then increments the VCO 130 over a range of frequencies. In one example embodiment, the VCO 130 is incremented over a range of about 870-920 MHz in steps of about 60 kHz (by adjusting the control voltage on the VCO 130 in steps of about 3 mV). In other embodiments, the frequency sweep may cover a range of about 10-100 MHz or any range subsumed therein in steps of 10 kHz-1 MHz or any range subsumed therein. These are examples only and other embodiments may use other ranges. This continues until the VCO 130 has stepped through the frequency range and the lamp 100 has ignited (as indicated by the ignited flag). This functionality is shown in blocks 422-430.

Figure 4D:
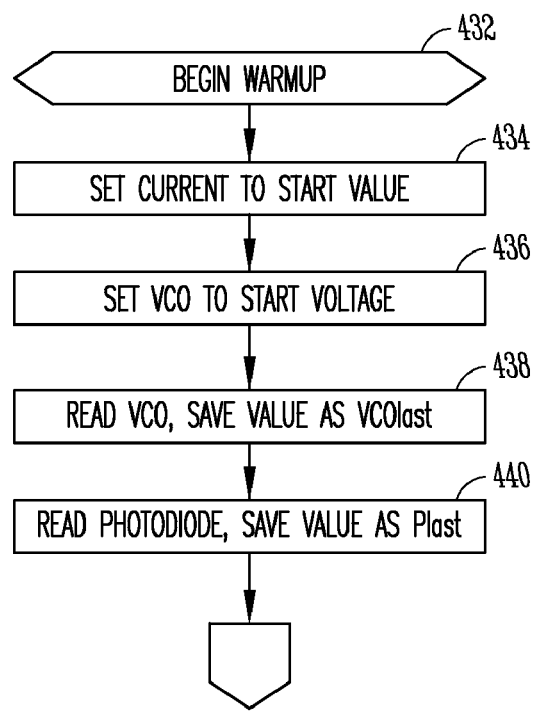

The lamp 100 then enters the warm up stage (see block 432) as shown in FIG. 4D. The microprocessor 132 then sets Vgs1 and Vgs2 to control the current in the circuit (as sensed by the current sensor 136) at the level desired for warm up (see block 434). As shown at block 436, the VCO 130 is set to its start value and stored by microprocessor 132 in memory as VCOlast (see block 438). As shown at block 440, the microprocessor 132 also reads the photodiode and saves the value as Plast.

Figure 4E:
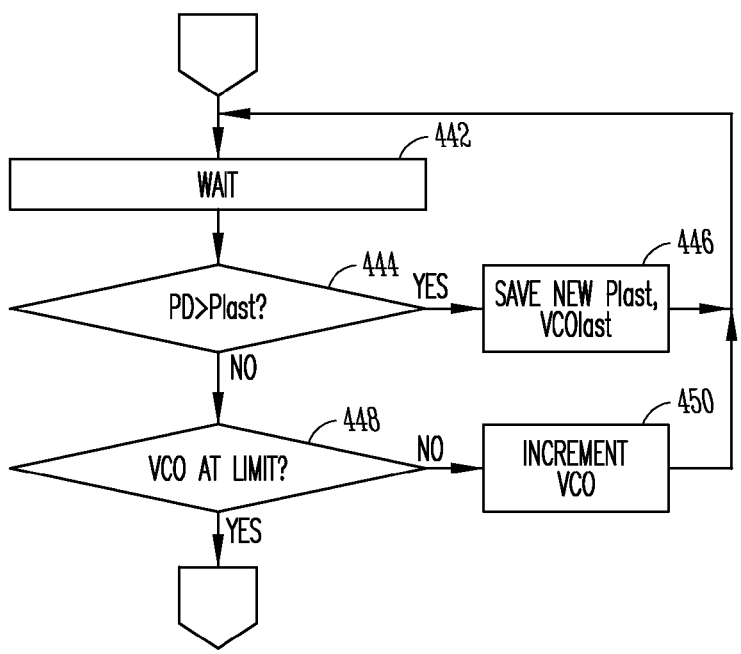

As shown at FIG. 4E, the microprocessor 132 then increments the VCO 130 over a range of frequencies (in a similar manner to that described in connection with FIG. 4C). The microprocessor 132 reads the photodiode after each increment. If the reading is higher than the prior highest value (Plast), the microprocessor 132 saves the value read by the photodiode as Plast and saves the VCO level as VCOlast (see block 446). This continues until the VCO 130 has been incremented through the full range of warm up frequencies and reaches the upper limit of the range. This functionality is shown in blocks 452-462.

Figure 4F:
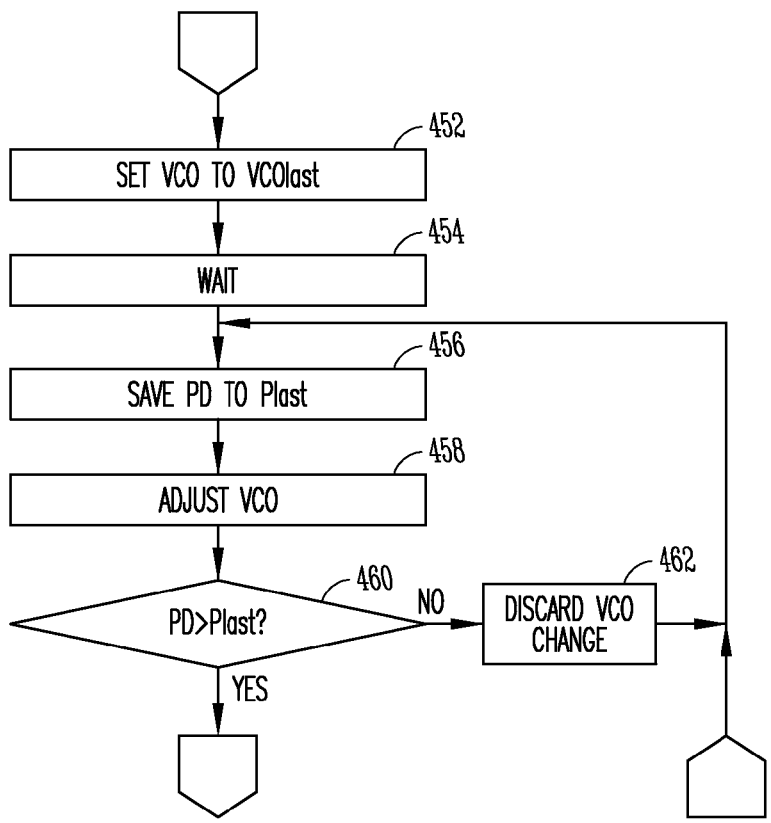
Figure 4G:
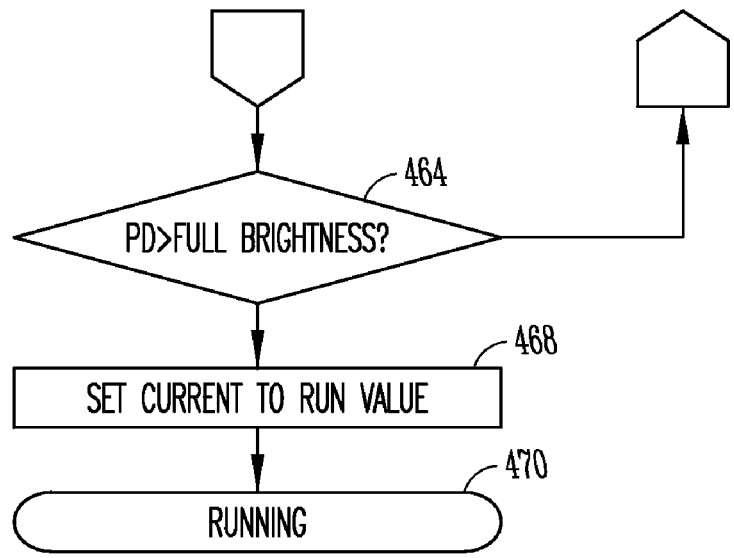

As shown in FIG. 4F, the VCO 130 is then set to VCOlast (see block 452) and a delay 454 occurs. Thereafter, as shown at block 456, the photodiode is read and saved as Plast. As shown at block 458, the microprocessor 132 then adjusts the VCO 130 in small increments to see if it will increase brightness. This continues (see blocks 460 and 462) until the photodiode detects full brightness as show in FIG. 4G. The microprocessor 132 then sets Vgs1 and Vgs2 to provide the desired current for run mode (see blocks 464, 468 and 470).

Figure 5A:
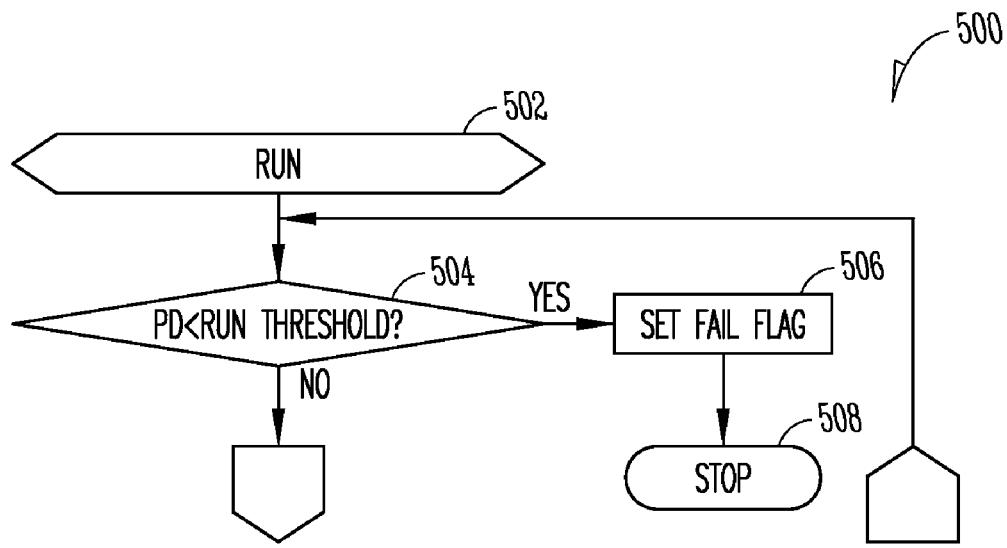
FIGS. 5A-F are flow charts of a method for running an electrodeless plasma lamp after startup according to an example embodiment.
Figure 5B:
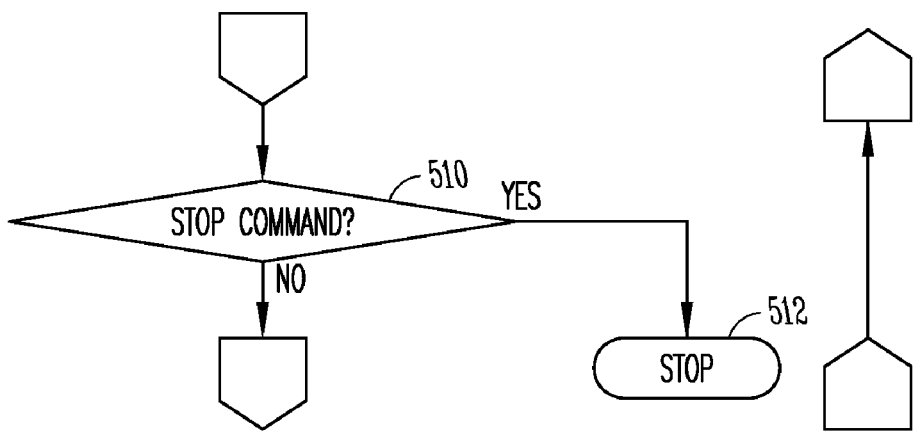
Figure 5C:
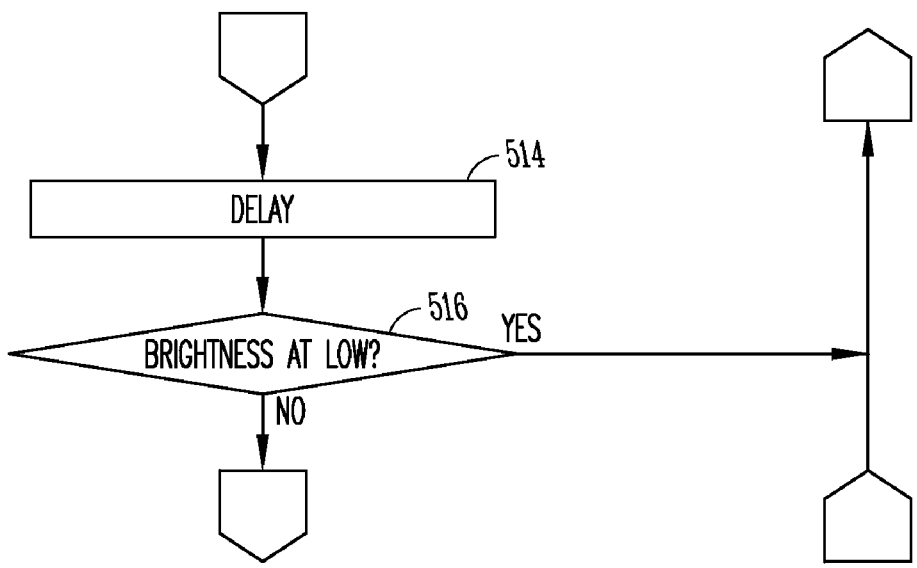
Figure 5D:
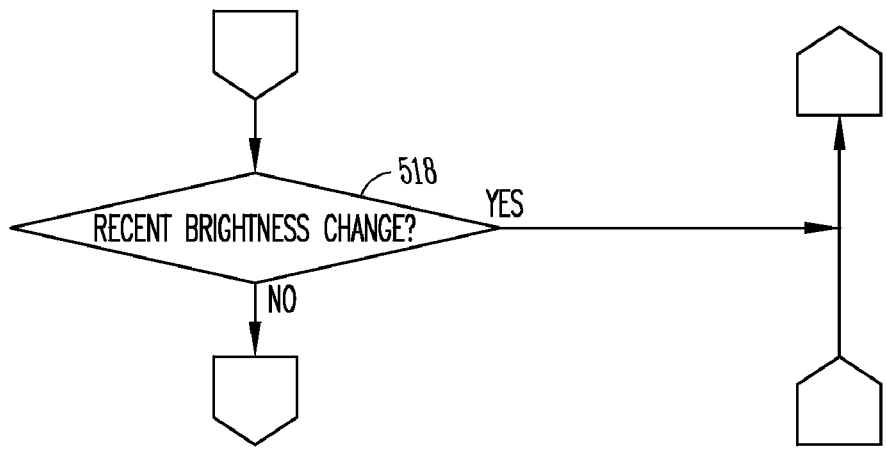
Figure 5E:
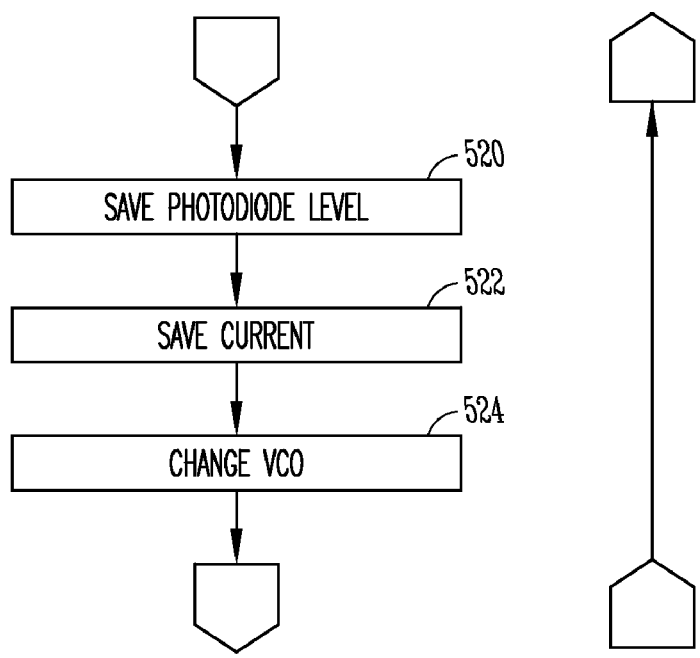
Figure 5F:
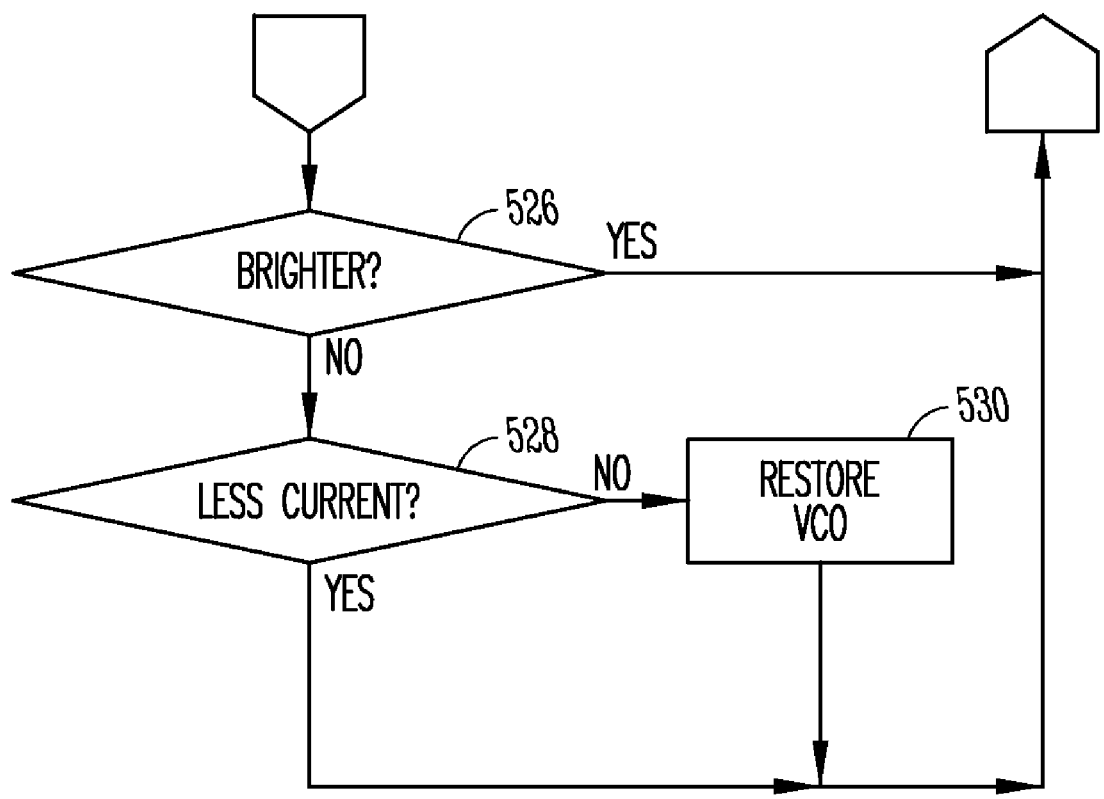

The operation of the lamp 100 in run mode will now be described by way of example with reference to a method 500 shown in FIGS. 5A-F. As shown in blocks 502, 504, 506 and 508 in FIG. 5A, the microprocessor 132 reads the photodiode to check that the level is above the level required for the run mode. As shown in FIG. 5B, the microprocessor 132 checks for the stop command (see block 510) to shut off the lamp 100 (see block 512). As shown in FIGS. 5C-F, the microprocessor 132 then checks for brightness changes and adjusts the current (by adjusting Vgs1 and Vgs2) to achieve the desired change in brightness. This functionality is shown by way of example in blocks 514, 516, 518, 520, 522, and 524.

In some embodiments, the drive circuit 106 also includes a spread spectrum mode to reduce EMI. The spread spectrum mode is turned on by the SS controller 333. When spread spectrum is turned on, the signal to the VCO 130 is modulated to spread the power provided by the lamp circuit 106 over a larger bandwidth. This can reduce ElectroMagnetic Interference (EMI) at any one frequency and thereby help with compliance with FCC regulations regarding EMI. In example embodiments, the degree of spectral spreading may be from 5-30% or any range subsumed therein. In example embodiments, the modulation of the VCO 130 can be provided at a level that is effective in reducing EMI without any significant impact on the plasma in the bulb 104, 200, 210.

In some example embodiments, the amplifier 124 may also be operated at different bias conditions during different modes of operation for the lamp 100. The bias condition of the amplifier 124 may have a large impact on DC-RF efficiency. For example, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In one example, when the lamp 100 is first turned on, the amplifier 124 is biased in a Class A/B mode. Class A/B provides better dynamic range and more gain to allow amplifier 124 to ignite the plasma and to follow the resonant frequency of the lamp 100 as it adjusts during startup. Once the plasma reaches its steady state operating condition (run mode), the amplifier 124 bias is removed which puts the amplifier 124 into a Class C mode. This provides improved efficiency. However, the dynamic range in Class C mode may not be sufficient when the brightness of the lamp 100 is modulated below a certain level (e.g., less than 70% of full brightness). When the brightness is lowered below the threshold, the amplifier 124 may be changed back to Class A/B mode. Alternatively, Class B mode may be used in some embodiments.

FIGS. 6A-D, show example embodiments of a plasma lamp 600 using one or more tuning holes 602 formed in a lamp body 604. The plasma lamp 600 may correspond to the plasma lamp 100 except that the lamp body 102 has one or more tuning holes added. The tuning hole 602 may improve matching of the impedance of the probe 120 to the lamp body 604 and plasma during the run state and thereby reduce reflected power from the lamp body 604 and/or to adjust/tune the resonant frequency of the lamp body 604. In some examples, the tuning hole 602 may be metallized or coated with a conductive material (or a conductive material may be inserted a desired length into the tuning hole 602). In other embodiments, the tuning hole 602 is not metallized and is uncoated.

Figure 6A:
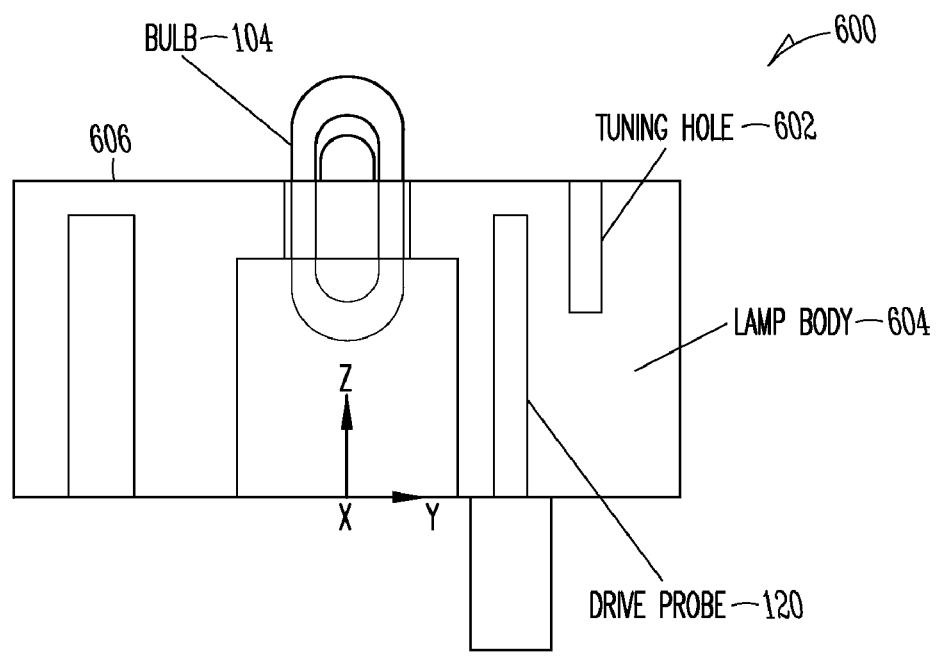
FIGS. 6A-D show example embodiments using a tuning hole in the lamp body for impedance matching and/or frequency tuning.
Figure 6B:
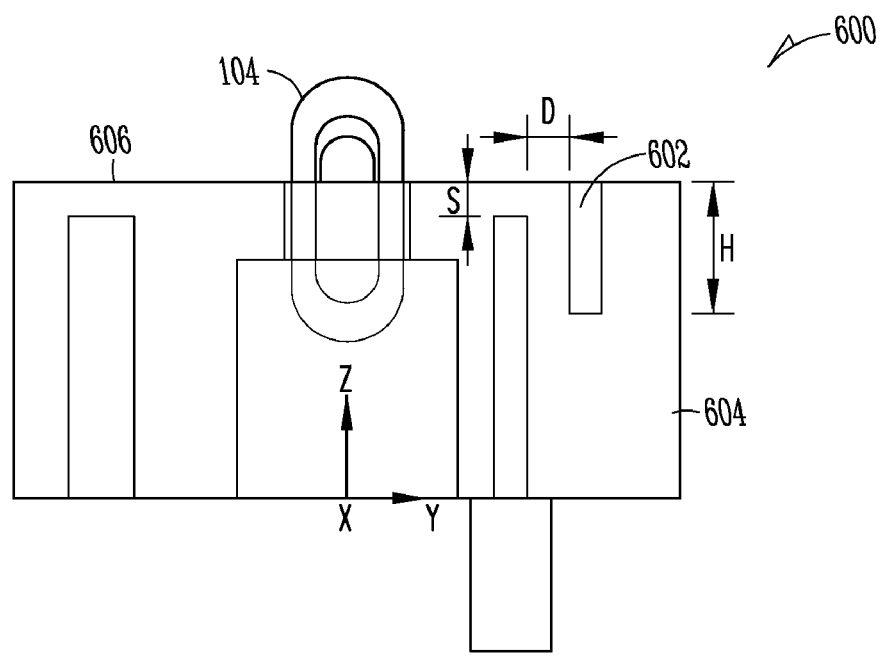
Figure 6C:
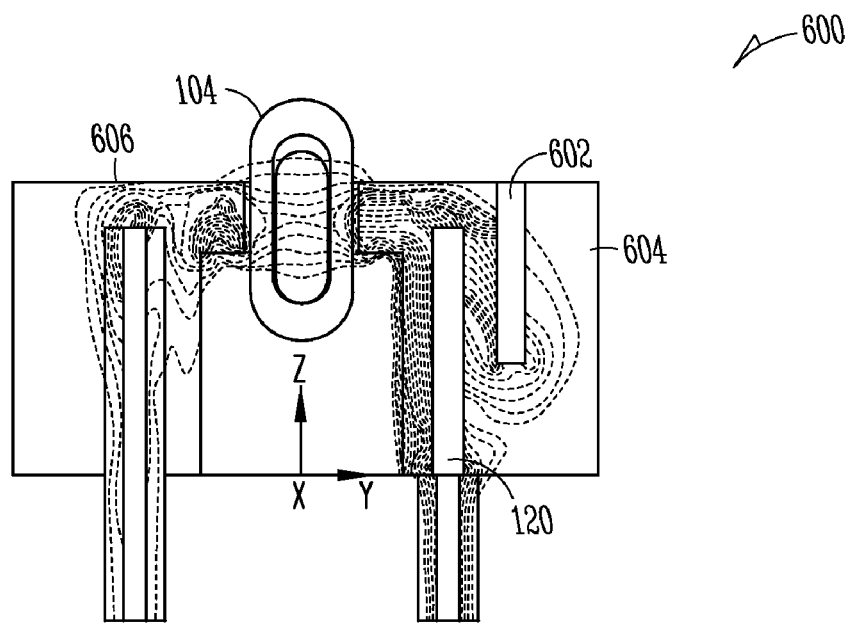

The following is an example description of how tuning holes may be used for impedance matching with reference to the plasma lamp 600 shown in FIGS. 6A-C. In some example embodiments, the depth of the drive probe 120 determines its capacitive coupling to the lamp body 604, which dictates the power transfer to the bulb 104 during the run state. There may be an optimum depth of the drive probe 120 that provides maximum power coupling to the bulb 104. In some embodiments, the depth of the drive probe 120 is constrained by failure modes like probe arcing to the top metallization of the lamp body 604. To achieve the required coupling without arcing in example embodiments, the tuning hole 602 may be used for matching the impedance of the probe 120 to the lamp body 604 and plasma during the run state. The dimensions S (distance from top metallized surface of lamp body 604), D (distance between drive probe 120 and tuning hole 602) and H (height/depth of tuning hole 602) in the FIG. 6B can be chosen such that the reflected power from the lamp body 604 is reduced relative to the amount of reflected power without the tuning hole 602 and without arcing from the probe 120 to the top metallized surface. In this example, the tuning hole 604 may be metallized. The tuning hole 604 provides an additional path for capacitive coupling of the probe 120 to the top surface of the lamp body 604. In some embodiment, this allows a wider range of probe depths to be evaluated for improving LPW (lumens per watt coupling efficiency) without affecting the impedance match. In example embodiments, the tuning hole 602 may also avoid probe arcing. FIG. 6C is a simulation showing strong E-fields between the probe 120 and the tuning hole 602. In one example, a lamp has a starting frequency of 937 MHz, net power of 180 W and a tuning hole 602 with dimensions S=3 mm, H=10 mm, and D=3 mm. In this example, reflected power is about 15 W. In another example, H is 13 mm and the reflected power drops to about 0.3 W (and the starting frequency is about 925 MHz).

Figure 6D:
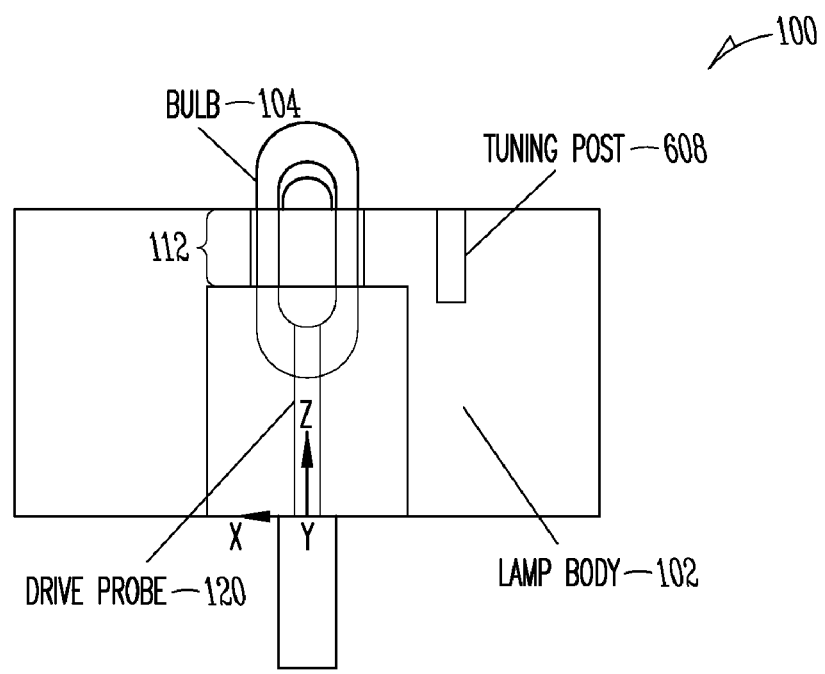

The following is an example description of how a tuning hole may be used for frequency tuning with reference to FIG. 6D. Since the thin region 112 of the lamp body 102 near the bulb 104 (see also FIG. 1A) is a high field or equivalently a highly capacitive region, modifications or addition of metallic posts close to this region can alter the fields and hence the frequency of the lamp body 102 in example embodiments. In some embodiments, this may be used to tune the lamp body 102 into the frequency range of interest. In some example embodiments, metalizing a tuning post 608 reduces the frequency and leaving it unmetallized and moving it closer to or in the thin region 112 increases the frequency. In one example, a lamp without a tuning hole has a starting frequency of about 944 MHz. When a metallized tuning hole with H of about 5 mm is included as shown in FIG. 6D, the starting frequency is about 924 MHz.

Figure 1B:
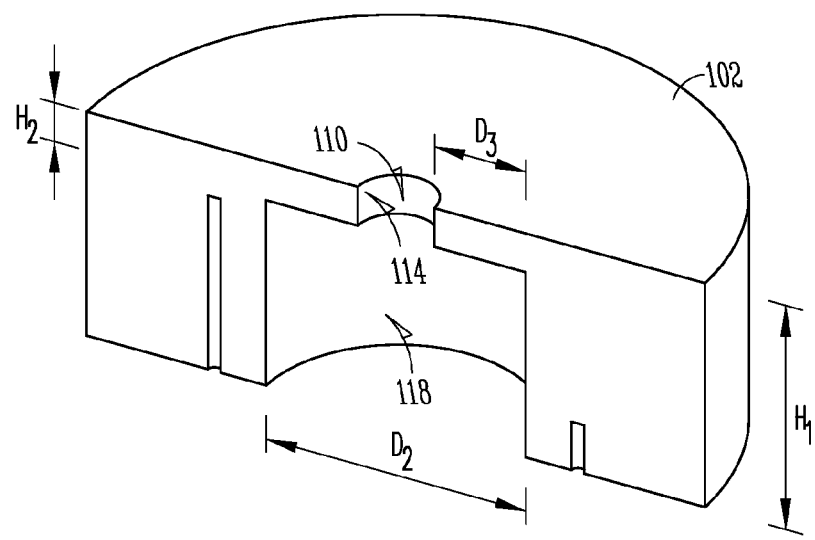
FIG. 1B is a perspective cross section view of a lamp body with a cylindrical outer surface according to an example embodiment.

Additional aspects of electrodeless plasma lamps according to example embodiments will now be described with reference to FIGS. 1A and 1B. In example embodiments, the lamp body 102 has a relative permittivity greater than air. The frequency required to excite a particular resonant mode in the lamp body 102 generally scales inversely to the square root of the relative permittivity (also referred to as the dielectric constant) of the lamp body 102. As a result, a higher relative permittivity results in a smaller lamp body 102 required for a particular resonant mode at a given frequency of power. The shape and dimensions of the lamp body 102 also affect the resonant frequency as described further below. In an example embodiment, the lamp body 102 is formed from solid alumina having a relative permittivity of about 9.2. In some embodiments, the dielectric material may have a relative permittivity in the range of from 2 to 100 or any range subsumed therein, or an even higher relative permittivity. In some embodiments, the lamp body 102 may include more than one such dielectric material resulting in an effective relative permittivity for the body within any of the ranges described above. The body may be rectangular, cylindrical or other shape as described further below.

In example embodiments, the outer surfaces of the lamp body 102 may be coated with an electrically conductive coating 108, such as electroplating or a silver paint or other metallic paint which may be fired onto the outer surface of the lamp body 102. The electrically conductive material 108 may be grounded to form a boundary condition for the radio frequency power applied to the lamp body 102. The electrically conductive coating helps contain the radio frequency power in the lamp body 102. Regions of the lamp body 102 may remain uncoated to allow power to be transferred to or from the lamp body 102. For example, the bulb 104 may be positioned adjacent to an uncoated portion of the lamp body 102 to receive radio frequency power from the lamp body 102. A high breakdown material, such as a layer of glass frit, may be coated on the outside of the electrically conductive coating 108 to prevent arcing, including the edges of the conductive material that are spaced a few millimeters from one another by the surfaces 114 of the lamp body 102.

In the example embodiment of FIG. 1A, the opening 110 extends through the thin region 112 of the lamp body 102. The surfaces 114 of the lamp body 102 in the opening 110 are uncoated and at least a portion of the bulb 104 may be positioned in the opening 110 to receive power from the lamp body 102. In example embodiments, the thickness H2 of the thin region 112 may range from 1 mm to 10 mm or any range subsumed therein and may be less than the outside length and/or interior length of the bulb 104. One or both ends of the bulb 104 may protrude from the opening 110 and extend beyond the electrically conductive coating 108 on the outer surface of the lamp body 102. This helps avoid damage to the ends of the bulbs from the high intensity plasma formed adjacent to the region where power is coupled from the lamp body 102. In other embodiments, all or a portion of the bulb 104 may be positioned in a cavity extending from an opening on the outer surface of the lamp body 102 and terminating in the lamp body 102. In other embodiments, the bulb 104 may be positioned adjacent to an uncoated outer surface of the lamp body 102 or in a shallow recess formed on the outer surface of the waveguide body. In some example embodiments, the bulb 104 may be positioned at or near an electric field maxima for the resonant mode excited in the lamp body 102.

A layer of material 116 may be placed between the bulb 104 and the dielectric material of lamp body 102. In example embodiments, the layer of material 116 may have a lower thermal conductivity than the lamp body 102 and may be used to optimize thermal conductivity between the bulb 104 and the lamp body 102. In an example embodiment, the layer of material 116 may have a thermal conductivity in the range of about 0.5 to 10 watts/meter-Kelvin (W/mK) or any range subsumed therein. For example, alumina powder with 55% packing density (45% fractional porosity) and thermal conductivity in a range of about 1 to 2 watts/meter-Kelvin (W/mK) may be used. In some embodiments, a centrifuge may be used to pack the alumina powder with high density. In an example embodiment, a layer of alumina powder is used with a thickness D5 within the range of about ⅛ mm to 1 mm or any range subsumed therein. Alternatively, a thin layer of a ceramic-based adhesive or an admixture of such adhesives may be used. Depending on the formulation, a wide range of thermal conductivities is available. In practice, once a layer composition is selected having a thermal conductivity close to the desired value, fine-tuning may be accomplished by altering the layer thickness. Some example embodiments may not include a separate layer of material around the bulb 104 and may provide a direct conductive path to the lamp body 102. Alternatively, the bulb 104 may be separated from the lamp body 102 by an air-gap (or other gas filled gap) or vacuum gap.

In some example embodiments, alumina powder or other material may also be packed into the recess 118 formed below the bulb 104. In the example shown in FIG. 1A, the alumina powder in the recess 118 is outside the boundaries of the waveguide formed by the electrically conductive material 108 on the surfaces of the lamp body 102. The material in the recess 118 provides structural support, reflects light from the bulb 104 and provides thermal conduction. One or more heat sinks may also be used around the sides and/or along the bottom surface of the lamp body 102 to manage temperature. Thermal modeling may be used to help select a lamp configuration providing a high peak plasma temperature resulting in high brightness, while remaining below the working temperature of the bulb material. Example thermal modeling software includes the TAS software package available commercially from Harvard Thermal, Inc. of Harvard, Mass.

In an example embodiment, the probe 120 may be a brass rod glued into the lamp body 102 using silver paint. In other embodiments, a sheath or jacket of ceramic or other material may be used around the probe 120, which may change the coupling to the lamp body 102. In an example embodiment, the printed circuit board (pcb) 240 (e.g., see FIG. 2d) may be positioned transverse to the lamp body 102 for the drive electronics. The probe 120 may be soldered to the pcb 240 and extend off the edge of the pcb 240 into the lamp body 102 (parallel to the pcb 240 and orthogonal to the lamp body 102). In other embodiments, the probe 120 may be orthogonal to the pcb 240 or may be connected to the lamp drive circuit 106 through SMA connectors or other connectors. In an alternative embodiment, the probe 120 may be provided by a pcb trace and portions of the pcb 240 containing the trace may extend into the lamp body 102. Other radio frequency feeds may be used in other embodiments, such as microstrip lines or fin line antennas. In other embodiments, the probe 120 may be connected to the lamp drive circuit 106 by a coaxial cable or other transmission line.

In an example embodiment, the drive probe 120 is positioned closer to the bulb 104 in the center of the lamp body 102 than the electrically conductive material 108 around the outer circumference of the lamp body 102. This positioning of the drive prove 120 can be used to improve coupling of power to the plasma in the bulb 104.

High frequency simulation software may be used to help select the materials and shape of the lamp body 102 and electrically conductive coating to achieve desired resonant frequencies and field intensity distribution in the lamp body 102. Simulations may be performed using software tools such as HFSS, available from Ansoft, Inc. of Pittsburgh, Pa., Multiphysics available from COMSOL, Inc. of Burlington, Mass. or Microwave Studio available from Computer Simulation Technology AG to determine the desired shape of the lamp body 102, resonant frequencies and field intensity distribution. The desired properties may then be fine-tuned empirically.

While a variety of materials, shapes and frequencies may be used, one example embodiment has a lamp body 102 designed to operate in a fundamental TM resonant mode at a frequency of about 880 MHz (although the resonant frequency changes as lamp operating conditions change as described further below). In this example, the lamp 100 has an alumina lamp body 102 with a relative permittivity of 9.2. The lamp body 102 has a cylindrical outer surface as shown in FIG. 1B with the recess 118 formed in the bottom surface. In an alternative embodiment, the lamp body 102 may have a rectangular outer surface. The outer diameter D1 of the lamp body 102 in FIG. 1B is about 40.75 mm and the diameter D2 of the recess 118 is about 8 mm. The lamp body 102 has a height H1 of about 17 mm. A narrow region 112 forms a shelf over the recess 118. The thickness H2 of the narrow region 112 is about 2 mm. As shown in FIG. 1A, in this region of the lamp body 102 the electrically conductive surfaces on the lamp body 102 are only separated by the thin region 112 of the shelf. This results in higher capacitance in this region of the lamp body 102 and higher electric field intensities. This shape has been found to support a lower resonant frequency than a solid cylindrical body having the same overall diameter D1 and height H1 or a solid rectangular body having the same overall width and height. For example, in some embodiments, the relative permittivity is in the range of about 9-15 or any range subsumed therein, the frequency of the RF power is less than about 1 GHz and the volume of the lamp body 102 is in the range of about 10 $cm^3$ to 30 $cm^3$ or any range subsumed therein.

In this example, a hole formed in the thin region 112 defines the opening 110. In an example embodiment, the hole has a diameter of about 5.5 mm and the bulb 104 has an outer diameter of about 5 mm. The shelf formed by the thin region 112 extends radially from the edge of the hole by a distance D3 of about 1.25 mm. Alumina powder is packed between the bulb 104 and the lamp body 102 and forms a layer having a thickness D5 of about ¼ mm. The bulb 104 has an outer length of about 15 mm and an interior length of about 9 mm. The interior diameter at the center is about 2.2 mm and the side walls have a thickness of about 1.4 mm. The bulb 104 (or bulbs 200,210) protrudes from the front surface of the lamp body 102 by about 4.7 mm. The bulb 104 has a high pressure fill of Argon, $Kr_{85}$, Mercury and Indium Bromide as described above. At pressures above 400 Torr, a sparker or other ignition aid may be used for initial ignition. Aging of the bulb 104 (or bulbs 200, 210) may facilitate fill breakdown, and the fill may ignite without a separate ignition aid after burn-in of about 72 hours.

In this example, the drive probe 120 is about 15 mm long with a diameter of about 2 mm. The drive probe 120 is about 7 mm from the central axis of the lamp body 102 and a distance D4 of about 3 mm from the electrically conductive material 108 on the inside surface of the recess 118. The relatively short distance from the drive probe 120 to the bulb 104 enhances coupling of power.

In this example, the bulb 104 is positioned adjacent to the narrow region 112 where the electric field of the radio frequency power in the lamp body 102 is at a maximum. In this example, the drive probe 120 is not positioned at a maxima or minima of the electric field of the radio frequency power in the lamp body 102. In example embodiments, the position of the probe 120 or probes may be selected for desired power coupling and impedance matching.

The above dimensions, shape, materials and operating parameters are examples only and other embodiments may use different dimensions, shape, materials and operating parameters.

What is claimed is:

1. An electrodeless plasma lamp comprising:
a power source to provide radio frequency (RF) power;
a lamp body to receive the RF power from a feed, the lamp body comprising a dielectric material having a dielectric constant greater than 2;
a bulb containing a fill that forms a plasma that emits light from a front side of the lamp body when at least a portion of the RF power is coupled to the fill;
a light guide to direct light from the bulb to a photosensor that is shielded from light output from the front side of the lamp body; and
a drive circuit to control operation of the lamp based on a level of light detected by the photosensor.

2. The plasma lamp of claim 1, wherein the bulb includes a tail to guide the light to the photosensor.

3. The plasma lamp of claim 2, wherein the tail is formed from a collapsed quartz tube.

4. The plasma lamp of claim 2, wherein the bulb has an interior width or diameter in a range between about 2 and 30 mm, a wall thickness in a range between about 0.5 and 4 mm, and an interior length between about 2 and 30 mm, the length of the tail being between about 2 mm and 25 mm.

5. The plasma lamp of claim 1, wherein the lamp body defines a tunnel to guide the light to the photosensor.

6. The plasma lamp of claim 1, wherein the lamp body comprises:
a back side opposed to the front side;
a recess extending from back side into the lamp body; and
an opening extending from the front side to the recess, the bulb being at least partially received within the opening and the light guide extending through the recess.

7. The plasma lamp of claim 6, wherein the bulb has an exposed end potion to emit light from the front side of the lamp body, and a concealed end portion to provide light to the light guide.

8. The plasma lamp of claim 6, further comprising an alumina powder packed within the recess around at least a portion if the light guide.

9. The plasma lamp of claim 6, wherein the light guide is a tail of the bulb.

10. The plasma lamp of claim 6, wherein at least a portion of the bulb is snugly received within the opening, light being emitted from the bulb from a first end portion from the front side of the lamp and the light guide guides light from a second end portion of the bulb to the photosensor.

11. The plasma lamp of claim 6, further comprising a circuit board mounted to the lamp body, the photosensor being mounted on the circuit board.

12. The plasma lamp of claim 11, wherein at least a portion of the drive circuit is positioned on the support and wherein the support has a channel to allow light to be collected from the light guide.

13. The plasma lamp of claim 12, wherein the channel is formed in an aluminum portion of a base plate and that guides light to the photosensor.

14. The plasma lamp of claim 1, wherein the lamp body defines a tunnel through which light passes to the photosensor.

15. The plasma lamp of claim 1, wherein the photosensor is a photodiode.

16. The plasma lamp of claim 1, wherein the light guide is a light pipe.

17. The plasma lamp of claim 1, further comprising a tuning hole in the lamp body that causes the RF feed to be more closely impedance matched to a resonant structure formed by the lamp body and plasma than the level of impedance matching that would result in the absence of the tuning hole.

18. The plasma lamp of claim 1, wherein the control circuit configured to pulse the power from an oscillator to an amplifier at a pulsing frequency higher than the response time of the plasma, wherein the power level to the amplifier is above the threshold level and the control circuit pulses the power to dim the brightness of the lamp below the level of brightness that would occur if the power was not pulsed.

19. A method comprising:
providing radio frequency (RF) power from a power source;
feeding the RF power to a lamp body, the lamp body comprising a dielectric material having a dielectric constant greater than 2 and coupling at least a portion of the RF power to a fill in a bulb to form a plasma that emits light;
guiding light from the bulb that is shielded from light output from a front side of the lamp body to a photosensor; and
controlling operation of the lamp based on a level of light detected by the photosensor.

20. An electrodeless plasma lamp comprising:
means for providing radio frequency (RF) power from a power source;
means for feeding the RF power to a lamp body, the lamp body comprising a dielectric material having a dielectric constant greater than 2 and coupling at least a portion of the RF power to a fill in a bulb to form a plasma that emits light;
means for guiding light from the bulb that is shielded from light output from a front side of the lamp body to a photosensor; and
means for controlling operation of the lamp based on a level of light detected by the photosensor.

* * * * *